(12) United States Patent
Sequeira et al.

(10) Patent No.: US 10,304,237 B2
(45) Date of Patent: May 28, 2019

(54) METHOD AND DEVICE FOR REAL-TIME MAPPING AND LOCALIZATION

(71) Applicant: The European Atomic Energy Community (EURATOM), represented by the European Commission, Brussles (BE)

(72) Inventors: Vitor Sequeira, Vila Nova de Gaia (PT); Erik Wolfart, Bardello (IT); Pierluigi Taddei, Gorgonzola (IT); Simone Ceriani, Tradate (IT); Carlos Sanchez-Belenguer, Valencia (ES); David Puig Alcoriza, Lainate (IT)

(73) Assignee: The European Atomic Energy Community (EURATOM), represented by the European Commission, Brussles (BE)

( * ) Notice: Subject to any disclaimer, the term of this patent is extended or adjusted under 35 U.S.C. 154(b) by 57 days.

(21) Appl. No.: 15/729,469

(22) Filed: Oct. 10, 2017

(65) Prior Publication Data
US 2018/0075643 A1    Mar. 15, 2018

Related U.S. Application Data

(63) Continuation of application No. PCT/EP2016/057935, filed on Apr. 11, 2016.

(30) Foreign Application Priority Data

Apr. 10, 2015 (EP) .................................. 15163231

(51) Int. Cl.
*G01S 7/48* (2006.01)
*G05D 1/02* (2006.01)
(Continued)

(52) U.S. Cl.
CPC ............ *G06T 15/10* (2013.01); *G01C 21/206* (2013.01); *G01S 7/4808* (2013.01); *G01S 17/42* (2013.01);
(Continued)

(58) Field of Classification Search
CPC .......... G06T 15/10; G06T 7/579; G06T 7/20; G06T 15/08; G06T 2200/04;
(Continued)

(56) References Cited

U.S. PATENT DOCUMENTS

| 8,798,840 B2* | 8/2014 | Fong | G05D 1/0274 |
| | | | 701/23 |
| 2012/0121161 A1* | 5/2012 | Eade | G09B 29/007 |
| | | | 382/153 |
| 2012/0194644 A1* | 8/2012 | Newcombe | G06T 7/74 |
| | | | 348/46 |
| 2012/0300979 A1* | 11/2012 | Pirchheim | G06T 7/246 |
| | | | 382/103 |

(Continued)

FOREIGN PATENT DOCUMENTS

WO    WO 2016/162568    10/2016

OTHER PUBLICATIONS

Jablonski, Real-time voxel rendering algorithm based on Screen Space Billboard Voxel Buffer with Sparse Lookup Textures, WSCG 2016, pp. 27-36 (Year: 2016).*
(Continued)

*Primary Examiner* — Jacinta M Crawford
*Assistant Examiner* — Phuc N Doan
(74) *Attorney, Agent, or Firm* — Levine Bagade Han LLP

(57) ABSTRACT

A method for constructing a 3D reference map useable in real-time mapping, localization and/or change analysis, wherein the 3D reference map is built using a 3D SLAM (Simultaneous Localization And Mapping) framework based on a mobile laser range scanner A method for real-time mapping, localization and change analysis, in particular in GPS-denied environments, as well as a mobile laser scanning device for implementing said methods.

14 Claims, 10 Drawing Sheets

(51) Int. Cl.
- *G06T 7/20* (2017.01)
- *G01C 21/20* (2006.01)
- *G01S 17/42* (2006.01)
- *G01S 17/89* (2006.01)
- *G06T 15/08* (2011.01)
- *G06T 15/10* (2011.01)
- *G06T 7/579* (2017.01)

(52) U.S. Cl.
CPC ............ *G01S 17/89* (2013.01); *G05D 1/0272* (2013.01); *G06T 7/20* (2013.01); *G06T 7/579* (2017.01); *G06T 15/08* (2013.01); *G06T 2200/04* (2013.01); *G06T 2207/10028* (2013.01); *G06T 2215/16* (2013.01)

(58) Field of Classification Search
CPC ...... G06T 2207/10028; G06T 2215/16; G01C 21/206; G01S 7/4808; G01S 17/42; G01S 17/89; G05D 1/0272
See application file for complete search history.

(56) References Cited

U.S. PATENT DOCUMENTS

| | | | |
|---|---|---|---|
| 2014/0005933 A1 | 1/2014 | Fong et al. | |
| 2014/0350839 A1* | 11/2014 | Pack | G01C 21/30 701/409 |
| 2015/0161476 A1* | 6/2015 | Kurz | G06K 9/4671 382/190 |
| 2015/0316767 A1* | 11/2015 | Ebstyne | G06T 7/80 345/8 |
| 2016/0189419 A1* | 6/2016 | Fakih | G06T 17/005 345/419 |

OTHER PUBLICATIONS

Lie et al., "Indoor localization and visualization using a human-operated backpack system", Indoor Positioning and Indoor Navigation (IPIN), 2010 International Conference on, IEEE, Piscataway, NJ, USA, Sep. 15, 2010 (Sep. 15, 2010), pp. 1-10, XP031809367, ISBN: 978-1-4244-5862-2.

* cited by examiner

METHOD AND DEVICE FOR REAL-TIME MAPPING AND LOCALIZATION

CROSS-REFERENCE TO RELATED APPLICATIONS

This application is a continuation of International Patent Application Number PCT/EP2016/057935 filed on Apr. 11, 2016 which claims priority to European Patent Application Number 15163231.2 filed Apr. 10, 2015, the contents of which are incorporated herein by reference in their entirety.

TECHNICAL FIELD

The present invention generally relates to localization and mapping, especially in GPS-denied environments, such as indoors.

BACKGROUND ART

Different solutions have been described or are commercially available to allow for acquire environments for purposes such as localization or mapping. Different approaches have given rise to different solutions.

Among these, a number of commercial and prototype indoor navigation systems are based on inertial sensors (e.g. DLR's FootSLAM, Chirange Geospatial Indoor Tracking). They are small and inexpensive, however the position accuracy is low and drifts significantly over time. Furthermore, inertial systems do not generate map information. Therefore, they are only suitable for positioning and navigation purposes, not for map generation.

Other indoor positioning systems are based on the transmission of radio signals—similarly to GPS signals in outdoor environments. Some system use existing infrastructure (e.g. WiFi networks in airports, Navizon), others require the installation of dedicated infrastructure (e.g. NextNav, SenionLab). The systems have virtually no sensor costs (the client application uses a smart phone with dedicated software application), but they require network infrastructure emitting the radio signal. Furthermore, they do not generate map information. Therefore, they are only suitable for positioning and navigation purposes, not for map generation.

A further interesting product uses 3D scanning. ZEB1 is a commercial product that uses 3D laser scanning for fast (indoor) mapping. The laser is mounted on a spring and an oscillating movement needs to be created by hand. It generates an accurate 3D model of the indoor environment. However, the system does not provide immediate feedback to the user, as data processing is carried out off-line. Hence, the system is suitable for mapping but not for real-time localization.

A still further solution is a laser backpack developed at UC Berkley. It is a R&D project which proposes a backpack equipped with several 2D line scanners used to generate a 3D model of indoor environments. Again, it does not provide for on-line visualization.

A last solution is called LOAM (Lidar Odometry and Mapping) and consists of a portable sensor with associated algorithms that combine laser scanning and video imagery for real-time localization and mapping.

Almost all these solutions lack real-time/on-line visualization and more importantly they do not allow for any direct user interaction on the acquiring and processing steps.

US2014/005933A1 discloses a system and method for mapping parameter data acquired by a robot mapping system. Parameter data characterizing the environment is collected while the robot localizes itself within the environment using landmarks. Parameter data is recorded in a plurality of local grids, i.e., sub-maps associated with the robot position and orientation when the data was collected. The robot is configured to generate new grids or reuse existing grids depending on the robot's current pose, the pose associated with other grids, and the uncertainty of these relative pose estimates. The pose estimates associated with the grids are updated over time as the robot refines its estimates of the locations of landmarks from which it determines its pose in the environment. Occupancy maps or other global parameter maps may be generated by rendering local grids into a comprehensive map indicating the parameter data in a global reference frame extending the dimensions of the environment.

TIMOTHY LIU ET AL: "Indoor localization and visualization using a human-operated backpack system", INDOOR POSITIONING AND INDOOR NAVIGATION (IPIN), 2010 INTERNATIONAL CONFERENCE ON, IEEE, PISCATAWAY, N.J., USA, 15 Sep. 2010 (2010-09-15), pages 1-10, XP031809367, ISBN: 978-1-4244-5862-2 discloses techniques for indoor localization and visualization using a human-operated backpack system equipped with 2D laser scanners and inertial measurement units (IMU), in which scan matching based algorithms are used to localize the backpack in complex indoor environments. To address misalignment between successive images used for texturing when building 3D textured models, the authors propose an image based pose estimation algorithm to refine the results from the scan matching based localization.

WO2015/017941A1 discloses systems and methods for generating data indicative of a three-dimensional representation of a scene. Current depth data indicative of a scene is generated using a sensor. Salient features are detected within a depth frame associated with the depth data, and these salient features are matched with a saliency likelihoods distribution. The saliency likelihoods distribution represents the scene, and is generated from previously-detected salient features. The pose of the sensor is estimated based upon the matching of detected salient features, and this estimated pose is refined based upon a volumetric representation of the scene. The volumetric representation of the scene is updated based upon the current depth data and estimated pose. A saliency likelihoods distribution representation is updated based on the salient features. Image data indicative of the scene may also be generated and used along with depth data.

TECHNICAL PROBLEM

It is an object of the present invention to provide a system, device and method which do not only allow for real-time acquisition, mapping and localization particularly in GPS-denied environments, but which will also provide for real-time visualization and the possibility for user interaction. Moreover, the present invention should allow for also providing real-time comparison of the current acquired data with previously acquired maps. This would allow identifying differences or changes that occurred since the last mapping. Such on-line identification of changes or differences may be of great benefit in applications such as security inspections, civil construction, as well as emergency or disaster management.

GENERAL DESCRIPTION OF THE INVENTION

To achieve this object, the present invention proposes, in a first aspect, a method for constructing a 3D reference map of an environment useable in (a method for) real-time mapping, localization and/or change analysis, comprising the following steps:

(a) acquiring (3D) scanner data of the environment with a mobile real-time laser range scanner at a rate of at least 5 frames (i.e. 5 point clouds), preferably at least 10 frames per second, (b) constructing, using the (3D) scanner data for each of a plurality of poses of the laser range scanner, each pose having an associated point cloud defined by the scanner data, a map presentation, the map presentation having a data structure configured for random sample access thereto in constant time, fast nearest neighbor search and scalability over large areas, and (c) building, using the map presentation, the 3D reference map for the environment using a 3D Simultaneous Localization And Mapping (3D SLAM) framework, said building comprising (i) using an odometer module estimating a current pose of the laser range scanner for each point cloud based on the registration of the (last) point cloud to the local map presentation, (ii) using a local trajectory optimization module refining the trajectory of a (sub)set of point clouds in order to minimize the drift in the local map presentation, and (iii) performing offline a global trajectory optimization by reconstructing an entire map of the environment (preferably by using the entire set of point clouds) taking advantage of (or taking into account) loop closures, thereby forming said 3D reference map.

The invention further relates to such a method, wherein the local trajectory optimization module comprises a local window mechanism optimizing a trajectory fragment composed by a set of poses and their associated point clouds with respect to a map built up to the last registered set, wherein points are preferably converted in world coordinates using pose interpolation in $\mathbb{SE}3$ group and wherein a generalization of Iterative Closest Point method is preferably used to find the trajectory that better aligns all the points to the map; wherein the local window mechanism operates such that, when the distance between the first and the last pose in the list is larger than a threshold, cloud poses are optimized and a new list is produced with the refined pose and the input clouds.

In a particularly preferred embodiment, the data structure is set to natively handle 3D points and is based on a hybrid structure composed by a sparse voxelized structure used to index a (compact dense) list of features in the map presentation, allowing constant time random access in voxel coordinates independently from the map size and efficient storage of the data with scalability over the explored space.

In a still further preferred embodiment, the data structure may maintain five different representations of the data stored, thereby granting consistency between internal data representations after each map update, the five representations being (i) a (compact and dense) list of features, L and an index to the last element, $L_{last}$, where each element, $l_i \in L$, contains all the information associated to a feature in the map, such as position and normal unit vector in world coordinates, and preferably additional information, (ii) a (compact and dense) validity mask, M, where each element, $m_i \in M$, is a boolean value indicating if its corresponding sample, $l_i \in L$, is valid or not, ensuring that $m_i=0, i>L_{last}$, (iii) a list of holes, H, where each element, $h_i \in H < L_{last}$, indicates that $l_{h_i}$ is not valid so, $m_{h_i}=0$, (iv) a sparse voxel representation V, built with a parametrizable cell size, that stores in each cell, $v_i \in V$, the index of its corresponding feature in L, wherein features in L and cells in V are related in a one-to-one manner, based on the position of $l_i$ and the cell size of V, and (v) a kd-tree, K, which is used to perform nearest neighbor searches on the map and which only stores references to the dense list L to keep its memory footprint low.

The present method may further comprise the step, wherein, given an area of interest expressed by a central position and a radius, inner features are selected by looping over the elements stored in L and the kd-tree K is rebuilt as a fast mechanism for nearest neighbor searches.

In a second aspect, the invention relates to a method for real-time mapping, localization and change analysis of an environment, i.e. relative to the 3D reference map of the environment which is available from a method according to the first aspect of the invention as described above or from a such a 3D reference map already updated or modified through a previous run of the present method, in particular in a GPS-denied environment, preferably comprising the following steps:

(a) acquiring (3D) scanner data of the environment with a real-time laser range scanner at a rate of at least 5 frames (point clouds) per second, (b) during place recognition, identifying a current location of the laser range scanner inside a known environment (i.e. within the 3D reference map) with no prior knowledge of the scanner pose during place recognition and pre-computing of simple and compact descriptors of the scene acquired by the laser range scanner using a reduced search space within the scene; in order to self-localize the scanner in real-time, or identifying a current location of the laser range scanner within the 3D reference map making use of the pre-computed descriptor space in order to self-localize the scanner in real-time using pre-computed compact descriptors of the 3D reference map at potential scanner poses, (c) after determination of the localization of the scanner in the known environment (i.e. within the 3D reference map), tracking the scanner pose by registering current scanner data inside a 3D reference map using standard Iterative Closest Point method employing data comprising nearest-neighbor information, (d) calculating the distance between each scan point in the current scanner data and nearest point in the 3D reference map, wherein change analysis is performed by applying a threshold to this distance, (whereby each point in the current scanner data which has a corresponding neighbor in the reference model that is further than the threshold is considered a change), and (e) displaying information about the 3D reference map and the current (3D) scanner data on a real-time user interface, said information being preferably color-coded according to a change/no-change classification of said information.

Preferably, step (b) comprises the identification of a set of possible locations of the scanner based on the scanner data of step (a), said step (b) further the following substeps:

(b1) based on the last scanner data, computing an associated descriptor q and recovering a set of candidate locations $\Gamma$. The candidate locations have a descriptor similar to q, i.e. the distance in descriptor space is smaller than a threshold radius r. The set of candidate locations $\Gamma$ can be recovered by performing a radial search on T given a threshold radius r in the descriptor space, preferably for 360° horizontal view scanner data, increasing the candidate locations by computing additional input descriptors by horizontally shifting range values, each descriptor corresponding to the readings that the scanner would produce if rotated on its local axis and then rotating according to i each resulting set of candidate locations, (b2) associating a weight $w_{\Gamma_p}$ to each potential location $\Gamma_p \in \Gamma$:

$$w_{\Gamma_p} = 1 - \frac{\|d_p - q\|}{r},$$

where $d_p$ is the descriptor associated to the location $\Gamma_p$ retrieved from T, $w_{\Gamma_p}$ is 1 for perfectly matching descriptors and 0 for descriptors on the search sphere boundary, and (b3) collecting weights in w and normalizing these weights to have max w=1.

Advantageously, step (b) further comprises the substeps (b4) updating the set of candidate locations while the sensor moves by estimating the movement (using the odometer module as described in step (c)(i) of the method of the first aspect above) and re-evaluating the weight for each initial candidate pose based on the query results at the new pose, and (b5) iterating the update substep until the candidate poses converge to a single location (i.e. until the method is able to disambiguate the current pose).

Particularly for ground motion, whereby the laser range scanner is mounted on a person (e.g. with a backpack) or on a vehicle traversing a floor, the method may comprise the following steps (i) identifying in the 3D reference map the extents of a floor, wherein floor extraction is performed over a sparse voxel representation of the environment (3D reference map), V, where each full cell, $v^{(i)}$, of the sparse voxel representation contains a normal vector to the surface locally defined by the points around its centroid, $\bar{n}^{(i)}$, by extracting a subset of voxels that represent candidate floor cells, $F \subseteq V$, by checking that the vertical component in their associated normals is dominant, i.e. $\bar{n}^{(i)} \cdot (0,0,1)^T \geq \varepsilon$, where $\varepsilon$ is typically a value between 0.5 and 1

(ii) determining reachability of cells, wherein given a reachable cell $f \in F$, all surrounding cells ($g^{(1)}, g^{(2)}, \ldots, g^{(m)}) \in F$ are considered as reachable if the following conditions are satisfied:

$$\|f - g^{(i)}\| \leq \theta_0 \quad (6)$$

$$\|f_z - g_z^{(i)}\| \leq \theta_1 \quad (7)$$

$$C_{g(i)} \cap V = \emptyset \quad (8)$$

where $\theta_0 \geq V_{cellSize}$ cellSize in (6) stands for the maximum step distance (e.g. 0.5 meters for a walking motion, or $V_{cellSize}$ for a car motion), $\theta_1$ in (7) stands for the maximum vertical step size and $C_{g(i)}$ in (8) stands for the simplified volume of the observer, centered over the floor cell $g_i$.

The map structure useable in the context of the present invention preferably comprises two different lists of elements that are stored and synchronized: a (compact) list of planes, L, and a (dense) grid of voxels, V, built with a specific voxel size, each plane $l_i \in L$ storing a position in world coordinates, $p_i$, and a unit normal, $\bar{n}_i$; wherein each voxel, $v_i \in V$ stores a current state that can be either full, empty or near, full voxels storing an index to the plane $l_{v_j} \in L$, whose associated position falls into, empty cells storing a null reference and near cells storing an index to the plane $l_{v_j} \in L$ whose associated position distance $d_v$ to the voxel centre is the smallest; preferably a near voxel is considered only if the distance $d_v$ is under a given threshold $d_{max}$, otherwise the voxel is considered empty.

To improve overall system robustness, it is considered to combine the scanner tracking with an odometer (e.g. using the odometer module as described in step (c)(i) of the method of the first aspect above), such that after a pose has been estimated, its associated points in world coordinates are stored into a kd-tree (thus creating an odometer map), given a new acquisition (point cloud acquired) by the laser range scanner, (i.e. when a registration algorithm creates the sets of points) ($P_i^W$), it looks for nearest neighbors in both the 3D reference map ($q_i^M, \bar{n}_i^M$) and in the previously fixed point cloud (odometer map) ($q_i^O, \bar{n}_i^O$), wherein correspondences are defined as:

$$c_i^{(j)} = \begin{cases} \{p_i^W, q_i^M, \bar{n}_i^M\} & \|p_i^W - q_i^M\| - s \leq \|p_i^O - q_i^O\| \\ \{p_i^W, q_i^O, \bar{n}_i^O\} & \|p_i^W - q_i^M\| - s > \|p_i^O - q_i^O\| \end{cases},$$

where S corresponds to the voxel cell size and compensates the different resolution between the voxelized ground truth map and the non-discretized kd-tree of the previously fixed cloud.

In a third aspect, the invention proposes a mobile laser scanning device for real-time mapping, localization and change analysis, in particular in GPS-denied environments, implementing one or more of the methods described herein. In particular, the invention relates to a mobile laser scanning device for real-time mapping, localization and change analysis, in particular in GPS-denied environments, comprising a real-time laser range scanner, a processing unit, a power supply unit and a hand-held visualization and control unit, wherein the real-time laser range scanner is capable of acquiring the environment with a rate of at least 5 frames, preferably at least 10 frames per second to provide scanner data, the processing unit is arranged to analyze said scanner data and to provide processing results comprising 3D map/model, localization and change information to the hand-held visualization and control unit, which is arranged to display said processing results and to allow a user to control the mobile laser scanning device.

A device according to the invention is thus capable of on-line, real-time processing providing 3D mapping/modelling of the environment, precise localization of the user (with respect to generated map or existing map/model), change detection with respect to previously acquired model and relies fully on laser signal which makes it independent of ambient illumination and GPS signal. Moreover, it does not require additional sensors such as GPS or inertial sensors. Nonetheless, the present invention does not exclude adding further sensors if deemed useful. Thus, optional sensors may be added to enrich the generated model (e.g. color cameras). Furthermore, although the device is capable of providing on-line and real-time results to the user, it is further foreseen to use the acquired data and to further process it off-line, e.g. for refinement of acquired 3D model for future localization and change analysis.

The device according to the present invention may be used and is useful in numerous applications such as e.g. 3D (indoor) mapping/modelling, facility management, accurate, real-time indoor localization and navigation, design information verification, change analysis (e.g. for safeguards inspections), progress monitoring (e.g. for civil construction), disaster management and response, etc.

In the mobile laser scanning device, the visualization and control unit is preferably a touch screen computer, more preferably a tablet computer.

The mobile laser scanning device is most preferably a backpack or vehicle mounted device.

In a fourth aspect, the invention proposes the use of methods or of mobile laser scanning devices as described herein for 3D outdoor and indoor, preferably indoor mapping/modelling; facility management; accurate and real-time indoor localization and navigation; assistance to disabled or elderly people; design information verification; change analysis, such as for safeguards inspections; progress monitoring, such as for civil construction; or disaster management and response.

A fifth aspect concerns a computer program product having computer executable instructions for causing a programmable device, preferably a mobile laser scanning device or its processing unit as described herein to execute one or more of the methods of the present invention.

In a final aspect, the invention also relates to a computer-readable medium, having stored therein data representing instructions executable by a programmed processor, the computer-readable medium comprising instructions for causing a programmable device, preferably a mobile laser scanning device of the invention or its processing unit, to execute one of the present methods.

The above aspects, further even more particulars of variants, alternatives and combination of features, as well as their advantages will be described more in detail below.

BRIEF DESCRIPTION OF THE DRAWINGS

Preferred aspects and embodiments of the invention will now be described, by way of example, with reference to the accompanying drawings.

Figure 1:
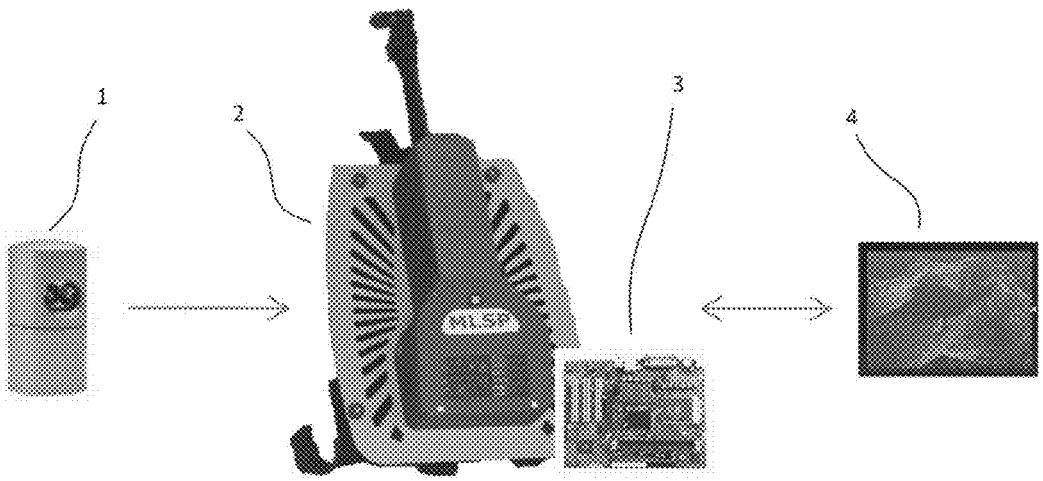
FIG. 1: Hardware components of a preferred embodiment of a mobile laser scanning device according to the present invention, called Mobile Laser Scanning Platform (MLSP system, or simply MLSP) comprising a 3D laser scanner 1, a backpack 2, a processing unit 3 (contained within the backpack, shown separately for illustration only) and a tablet 4.

Further details and advantages of the present invention will be apparent from the following detailed description of several non-limiting aspects and embodiments with reference to the attached drawings. Indeed, the detailed description below is not to be construed to limit the scope of the invention, but rather to illustrate particular aspects presented in the general description, claims and drawings.

DESCRIPTION OF PREFERRED EMBODIMENTS

As already mentioned previously, one of the main advantages of preferred embodiments of the present invention as herein described lies in the concept of providing real-time change analysis and monitoring in GPS-denied (e.g. indoor) environments. The user is able to inspect a facility and view the changes on a handheld device as he walks through the facility. The preferred underlying methodologies and algorithms are summarized below and further detailed thereafter.

A basic workflow for a previously unknown (unscanned) location requires in principle two steps: (A) the construction of a 3D reference model at T0 and (B) the localization, tracking and change analysis based on 3D reference model at T1. When revisiting such a location or in cases where an appropriate map already exists, step (B) will be sufficient.

(A) Construction of 3D Reference Map

The 3D reference map is built using a 3D SLAM (Simultaneous Localization And Mapping) implementation based on a mobile laser range scanner as described below. The main features preferably are:

1) An efficient map presentation that allows random sample access in constant time, fast nearest neighbor search and scalability over large areas (see section A.2. below).
2) The SLAM framework (see section A.3. below) contains:
   a) An odometer to estimates the current pose based on the registration of the last cloud to the local map representation.
   b) A local trajectory optimization that refines the trajectory of a set of clouds in order to minimize the drift in the generated map.
   c) A global trajectory optimization that allows reconstructing an entire map of the environment taking advantage of loop closures.

The odometer is typically performed in real-time. The map optimization can be carried out in a post-processing step.

(B) Localization, Tracking and Change Analysis Based on 3D Reference Model

The real-time localization, tracking and change analysis generally requires an existing 3D reference map of the environment which has been previously been generated as described above. The main components preferably are 1) During place recognition the system identifies the current location inside the known environment with no prior knowledge of the sensor pose. It pre-computes simple and compact descriptors of the scene and uses an efficient strategy to reduce the search space in order to self-localize the sensor in real-time (see section B.2. below).
2) Once the sensor is localized in the known environment, the system starts tracking the sensor pose by registering the current observation (3D scan) inside the 3D reference map using the standard Iterative Closest Point (ICP) method. In order to accurately track the sensor pose in real-time, the system implements a number of improvements, e.g. it employs a data structure specially designed for fast nearest neighbor searches (see section B.3. below).
3) Given the nearest-neighbor information in the data structure, MLSP can efficiently calculate the distance between each scan point in the current observation and nearest point in the 3D reference model. The change analysis is performed by applying a simple threshold to this distance, e.g. each point in the current scan which does not have a corresponding neighbor in the reference model (or which has a corresponding neighbor in the reference model but which that is farther than the threshold) is considered a change. The real-time user interface shows the 3D reference model and the current observations which are color-coded according to a change/no-change classification.

A. Construction of 3D Reference Map

Precise 3D mapping and 6DOF trajectory estimation using exteroceptive sensors are key problems in many fields. Real-time moving laser sensors gained popularity due to their precise depth measurements, high frame rate and large field of view.

In one preferred aspect, the present invention proposes an optimization method or framework for Simultaneous Localization And Mapping (SLAM) that properly models the acquisition process in a scanning-while-moving scenario. Each measurement is correctly reprojected in the map reference frame by considering a continuous time trajectory which is defined as the linear interpolation of a discrete set of control poses in $SE3$. The invention also proposes a particularly efficient data structure that makes use of a hybrid sparse voxelized representation, allowing large map management. Thanks to this the inventors were also able to perform global optimization over trajectories, resetting the accumulated drift when loops are performed.

The inventors experimentally showed that such framework improves localization and mapping w.r.t. solutions that compensate the distortion effects without including them in the optimization step. Moreover, the inventors show that the proposed data structure provides linear or constant operations time w.r.t. the map size in order to perform real time SLAM and handles very large maps.

A.1. Introduction

Generation of 3D maps and estimation of trajectories are fundamental building blocks for a wide variety of applications in robotics, autonomous guidance and surveillance. Simultaneous Localization And Mapping (SLAM) techniques jointly build the map of an unknown environment and localize the sensor in the same environment. SLAM formulations have been proposed for standard cameras, depth cameras and laser scanners. Most SLAM systems based on laser scanners use variations of the Iterative Closest Point (ICP) algorithm to perform scans alignments. A review of ICP algorithms focused on real time applications can be found in S. Rusinkiewicz and M. Levoy, "Efficient variants of the ICP algorithm," in 3DIM, 2001. Real time moving 3D LIDAR sensors, such as Velodyne scanners, recently gained popularity: these devices have a high data rate, often provide a complete 360° horizontal field and have a good accuracy on distance measurements.

Such sensors (scanners) acquire measurements while moving and thus represent non-central projection systems that warp acquired frames along the trajectory path. Alignment of such produced point clouds requires a proper treatment of the warping effect on the 3D points. The SLAM framework proposed in F. Moosmann and C. Stiller, "Velodyne SLAM," in IVS, 2011, unwarps each cloud given the current speed of the sensor, performs ICP and unwarps again the points with the new estimated speed. LOAM algorithm (J. Zhang and S. Singh, "LOAM: Lidar odometry and mapping in real-time," in RSS, 2014) performs a continuous estimation of the motion by focusing on edges and planar features to remove the warping effect in each cloud. When a complete frame is generated it unwarps the final point cloud using the predicted final pose. The work of C. H. Tong, S. Anderson, H. Dong, and T. D. Barfoot, "Pose interpolation for laser-based visual odometry," Journal of Field Robotics, vol. 31, pp. 731-757, 2014, performs interpolation employing a continuous-time Gaussian Process Model (GPGN) that relies on matched features in the acquisition reflectance images.

In a preferred aspect of the present invention it is proposed to use a local window mechanism that optimizes a trajectory fragment composed by a set of poses and their associated point clouds with respect to the map built up to the last registered set. Points are converted in world coordinates using pose interpolation in $\mathbb{SE}3$ group and a generalization of ICP is used to find the trajectory that better aligns all the points to the map. In this formulation the unwarp operation is part of the optimization strategy.

An important aspect for SLAM systems is their scalability to large environments and a real time management of the map to support the optimization routine. Generally scalability is achieved using sparse structures such as general octrees, dense voxel maps that use volume cyclical indexing, or sparse representations based on voxel hazing. In one aspect, the invention focuses on a data structure that natively handles 3D points and that is based on a hybrid structure composed by a sparse voxelized structure, which is used to index a compact dense list of features. This allows constant time random access in voxel coordinates independently from the map size and efficient storage of the data with scalability over the explored space. The presently proposed structure is capable of maintaining in memory the entire global map and to update local sections in case graph optimization is employed (e.g. to perform loop closures).

Main contributions of some embodiments of the invention are (i) the use of a generalized ICP algorithm incorporating the unwarping in the estimation process, (ii) the use of an efficient structure for the map management that allows both fast spatial queries and big environment management. The inventors have validated their approach using publicly available datasets and additional acquired indoor/outdoor environments.

Section A.2. below presents the data structure for map management and its available operations; Section A.3. presents the optimization framework; Section A.4. shows experimental results obtained with this method and, Section A.5. draws some conclusions.

A.2. Map Representation

A data structure suited for real-time SLAM applications should provide (i) random sample access in constant time (on average) to stored features, (ii) exhaustive feature iteration in linear time w.r.t. the number of elements stored and (iii) fast nearest neighborhood searches given a query feature. Moreover, it should provide (iv) scalability over the explored space and (v) it should efficiently support feature addition and removal.

Property (i) is generally associated to dense voxel representations, where memory requirements for scalability (iv) are the major drawback and exhaustive explorations (ii) are slow. Property (ii), conversely, is associated to sparse structures, where memory requirements (iv) are very low, but random access times (i) are slow (logarithmic in case of kd-trees). To exploit the intrinsic benefits of both dense and sparse structures while retaining all the required properties, the proposed preferred map structure maintains five different representations of the data stored. Consistency between internal data representations should be granted after each map update.

(i) A compact and dense list of features, L and an index to the last element, $L_{last}$, where each element, $l_i \in L$, contains all the information associated to a feature in the map (position, normal and additional information).

(ii) A compact and dense validity mask, M, where each element, $m_i \in M$, is a boolean value indicating if its corresponding sample, $l_i \in L$, is valid or not, ensuring that $m_i = 0, i > L_{last}$.

(iii) A list of holes, H, where each element, $h_i \in H < L_{last}$, indicates that $l_{h_i}$ is not valid so, $m_{h_i} = 0$.

(iv) A sparse voxel representation V, built with a parametrizable cell size, that stores in each cell, $v_i \in V$, the index of its corresponding feature in L. Features in L and cells in V are related in a one-to-one manner, based on the position of $l_i$ and the cell size of V. The present sparse voxel representation is based on an OpenVDB structure (K. Museth, "Vdb: High-resolution sparse volumes with dynamic topology," *ACM Transaction on Graphics*, vol. 32, no. 3, 2013).

(v) A kd-tree, K, that is used to perform nearest neighborhood searches on the map. K only stores references to the dense list L to keep its memory footprint low. The kd-tree can be built on a local region of the map if required (e.g. following an area around the last observation location).

By having a dense list of features, time for exhaustively exploring the entire map is linear in the number of elements contained. On the other hand, arbitrary queries are solved at constant random access time (on average) by exploiting the OpenVDB sparse voxel structure and caching system.

Given a new feature p to be added to the map, the proposed data structure is modified as follows: consider the feature's world position, $p^W$ and compute its corresponding voxel cell, $v_i$. If the cell is already filled ($v_i \geq 0$), its associated information is retrieved from $l_{v_i}$ and the value is updated if required. Otherwise ($v_i < 0$) a new feature is added to the structure. To do so, the insertion position, j, in L is computed as follows:

$$j = \begin{cases} h_0 \in H & \text{if } H \neq \emptyset \\ L_{last} + 1 & \text{if } H = \emptyset \end{cases}$$

then, internal values are updated as follows:

$$v_i = j, \; l_j = p, \; m_j = 1$$

and $$L_{last} = L_{last} + 1 \text{ if } H = \emptyset$$

$$H = H - \{h_0\} \text{ if } H = \emptyset$$

This way, while the set of holes contains elements, feature addition fills the gaps in the dense representation. When no holes remain, features are added at the end of the list.

In case a feature of the map has to be deleted, its corresponding voxel cell, $v_i$, is computed in the same way as before. The value stored in $v_i$ indicates the feature position in the dense list, $l_{v_i}$, and values are updated as follows:

$$m_{v_i} = 0, \; H = H + \{v_i\}, \; v_i = -1$$

This way, deleting features generates new holes in the dense list, without updating the value of $L_{last}$. Since M and H are correctly updated during the operation, internal data representation is still consistent, but the presence of too many holes may lead to decreasing performance.

To face this problem, the inventors propose in a particularly preferred embodiment to introduce a compact operation that populates the holes with the last elements in the lists by performing a swap in both L and M vectors. Affected values in V are then updated according to the new positions and $L_{last}$ is moved to the new last element of the compacted list. The cost of this operation is linear with respect to the number of holes so, in case $H = \emptyset$, it does nothing.

Finally, in order to provide a fast mechanism for nearest neighbor searches, given an area of interest expressed by a central position and a radius, inner features may be selected by looping over the elements stored in L (linear cost to the number of samples in the map) and the kd-tree K is rebuilt. Elements in K only store a reference to the associated features in L, thus K memory space is kept small (linear in the number of features present in the area of interest) and constant on average. The same operation can be performed without iterating over the entire list by visiting the voxel structure. The inventors investigate in the experimental section the differences between these two mechanisms.

Once the tree has been created, it will remain valid even if new features are added (already existing elements in L are not changed) or existing features are deleted (elements in L are marked as holes, but their value is not replaced), but not if both operations are performed (removed elements in L can be overwritten).

To perform the proposed operations efficiently, cloud additions are preferably postponed until a new kd-tree is required. When this happens, already existing features in the map outside the area of interest are deleted, creating new holes. Then, postponed clouds are added, by only adding the features that are inside the interest area. This way, previously created holes are filled with the new samples in constant time. If after all the additions there are still holes (more features were deleted than added), a compact operation may be performed, with a linear cost with respect to the remaining number of holes. Finally, K is rebuilt using the elements of L and can be used until a new one is required.

A.3. SLAM Framework

A preferred optimization framework of the invention is composed by two consecutive modules: an odometer that estimates the pose of each cloud given a map and a local trajectory optimizer that refines the trajectory of a set of clouds. Both modules employ the map data structure as described herein to handle the growing map.

Each feature stored in the map M is composed by a point world position $p^W$, its normal unit vector $n^W$ and additional information (e.g., reflectance). The latter are not used in the registration steps. This framework can also be extended to perform a global trajectory optimization that allows reconstructing an entire map of the environment taking advantage of loop closures.

The input of such a framework is a set of 3D point clouds $\{C_i\}$ produced with the data streamed by the sensor (in case of a Velodyne scanner, the point cloud is generated after a complete revolution of the sensor). Each point cloud $C_i$ is composed by a set of points $P=\{p_j\}$, $j=1 \ldots N_p$, a set of relative timestamps $T=\{t_j\}$ and a set of normal unit vectors $N=\{n_j\}$. Relative timestamps are assigned such that the first point produced has timestamp 0 and the last one has 1. Normal unit vectors may be estimated with the unconstrained least square formulation proposed in H. Badino, D. Huber, Y. Park, and T. Kanade, "Fast and accurate computation of surface normals from range images," in ICRA, 2011, taking advantage of box filtering on the point cloud grid structure.

Odometer

Initially, one needs to produce a first estimate of the sensor's trajectory by recovering the pose of each point cloud. Since the sensor is moving, one considers as representative pose of the cloud the sensor pose when the last point is received.

One performs a point-plane ICP between a subset of points of the last received cloud and the map. Like in F. Moosmann and C. Stiller, "Velodyne SLAM," in IVS, 2011, the selected points of the cloud are unwarped by considering the last estimated motion before performing the registration.

Given the cloud to be registered C, one considers the last relative motion estimated using the pose of the previous two registered clouds $\Gamma_{i-1}, \Gamma_{i-2} \in \mathbb{SE}\,3$:

$$\gamma = \log(\Gamma_{i-2}^{-1} \cdot \Gamma_{i-1}) \in \mathfrak{se}\,3$$

where $\gamma$ is expressed in $\mathfrak{se}3$ algebra with the inverse mapping function $\log(\cdot)$ (H. Strasdat, "Local accuracy and global consistency for efficient slam." Ph.D. dissertation, Imperial College London, 2012).

One then considers the subset of selected points $P_s=\{p_{s_j}\}$, $j=1; N_S$, with associated normals $N_s=\{n_{s_j}\}$ and relative timestamps $T_s=\{t_{s_j}\}$. The unwarp is performed on the selected points by computing:

$$\hat{\Gamma}_i = \Gamma_{i-1} \cdot \exp(\gamma)$$

$$\tilde{p}_{s_j} = \hat{\Gamma}_i^{-1} \cdot \Gamma_{i-1} \cdot \exp(\gamma * t_{s_j}) \otimes p_{s_j}$$

$$\tilde{n}_{s_j} = R(\hat{\Gamma}_i^{-1} \cdot \Gamma_{i-1} \cdot \exp(\gamma * t_{s_j})) \otimes p_{s_j}$$

where $\hat{\Gamma}_i$ is the predicted pose of the cloud $C_i$ and $\tilde{p}_{s_j}$ and $\tilde{n}_{s_j}$ are the selected points in the local coordinate frame of the predicted cloud pose $\hat{\Gamma}_i$. $\exp(\cdot)$ maps group $\mathbb{SE}\,3$ to the algebra $\mathfrak{se}3$.

Given these elements one performs the registration by estimating the pose $\Gamma^*_{ODO_i}$ with a point-plane ICP between the unwarped points and normals $\tilde{p}_{s_j}$ and $\tilde{n}_{s_j}$ and the map M, providing $\hat{\Gamma}_i$ as initial guess.

Each registered cloud $C_i$ with its associated pose $\Gamma^*_{ODO_i}$ is added to a list of registered clouds $RC_{ODO}$:

$$RC_{ODO} \leftarrow \{RC_{ODO}, [C_i, \Gamma^*_{ODO_i}]\}$$

Local Trajectory Optimizer

This module takes as input the list of clouds with their associated poses $RC_{ODO}$ and performs a trajectory refinement by employing a local window approach. When the distance between the first and the last pose in the list is larger than a threshold, cloud poses are optimized and a new list $RC_{REF}=\{[C_i, \Gamma^*_{REF_i}]\}$, $i=1: N_c$ is produced with the refined pose and the input clouds. Notice that this step properly integrates the unwarping in the optimization.

The objective function $e(\cdot)$ minimized in this step is the sum of the individual alignment errors of each cloud $e_i(\cdot)$:

$$e(RC_{ODO}, \Gamma_{ODO_0}) = \sum_{i=1}^{N_c} e_i(C_i, \Gamma_{ODO_{i-1}}, \Gamma_{ODO_i}) \quad (1)$$

which, in turn, depends on the pose associated with the first and the last point of the cloud. The initial pose of the first cloud in the sequence, $\Gamma_{ODO_0}$ is assumed to be the ending pose of the last cloud of the previous optimized set. $e_i(\cdot)$ is computed as the total error of a point-plane ICP generalized on a trajectory defined by the linear interpolation in $\mathbb{SE}\,3$ between two poses:

$$e_i(C, \Gamma_1, \Gamma_2) = \sum_{j=1}^{N_s} [(p_j^W - p_{NN}) \cdot n_{NN}]^2 \quad (2)$$

$$p_j^W = \Gamma_{12t} \otimes p_{s_j} \quad (3)$$

$$\Gamma_{12t} = \Gamma_1 \cdot \exp(t_{s_j} \log(\Gamma_1^{-1} \cdot \Gamma_2)) \quad (4)$$

where $\Gamma_{12_t}$ represents the world pose interpolated at time $t_j$ associated with the point $p_{s_j}$ selected for the registration. Given $p_{w_j}$, the estimated world coordinates of the current point, $p_{NN}$ and $n_{NN}$ are respectively its closest point retrieved from the map and its associated normal.

The entire objective function is minimized by alternating a Gauss-Newton step and the search for new correspondences in the map, until a convergence criterion is satisfied or a maximum number of iterations is reached.

The inventors suggest to use the manifold formulation proposed in R. Kuemmerle, G. Grisetti, H. Strasdat, K. Konolige, and W. Burgard, "g2o: A general framework for graph optimization," in ICRA, 2011: the optimization is performed over a perturbation vector $\Delta\Gamma$, composed by element of the $\mathfrak{se}3$ algebra over a pose $\Delta\Gamma$ in $\mathbb{SE}3$. The composition operation is defined as $\tilde{\Gamma}=\exp(\Delta\Gamma)\otimes\Gamma$. The Jacobians of the terms in the objective function are evaluated by applying the composition rule as $$\left.\frac{\partial e_i(C,\tilde{\Gamma}_1,\tilde{\Gamma}_2)}{\partial\Delta\Gamma_1}\right|_{\substack{\Delta\Gamma_1=0\\\Delta\Gamma_2=0}}$$

and similarly for $$\frac{\partial e(\cdot)}{\partial\Delta\Gamma_2}.$$

Each term $e_i(\cdot)$ in Equation 1 involves a pair of consecutive poses, thus the approximated Hessian results in a block tridiagonal matrix easily tractable by standard algorithms for Cholesky factorization on sparse matrices.

Once the optimization is terminated, the list $RC_{REF}$ can be updated with the optimized poses. Then, the entire set of points and normals of the clouds are converted into world coordinates according to Equation 3 and then added to the map M. At this stage one takes advantage of the efficient strategy to update the local map described in section A.2.: before adding points, one firstly deletes from the map all points that are further than a given radius from the last trajectory pose and then one adds the transformed clouds from $RC_{REF}$. Once the map is updated a new kd-tree is created on the resulting points to allow subsequent nearest neighbor searches. The list $RC_{ODO}$ is cleared and the odometer guess for the next cloud registration is updated according to the last two poses of $RC_{REF}$. The proposed formulation represents an adherent description of the real sensor model, which acquires points while moving: point transformations in world coordinates involve both initial and final poses of each cloud. Moreover, the estimation of each pose (apart the first and the last) is directly influenced by two clouds.

Global Trajectory Optimizer

The proposed framework can be extended to perform an off-line global optimization of the trajectory. Indeed, a limit of the proposed local trajectory optimizer consists in the inability to refine points (and consequently poses) that have already been added to the map. This limitation is generally acceptable when exploring environments at local scale but, when moving in very large environments, drift can be accumulated. For these cases, global optimization techniques that exploit loop closures or external absolute measurements have to be taken into account.

The inventors propose a global trajectory optimization that makes use of an enriched map description: for each feature in the map one adds to its position and normal in world coordinates ($p^W$ and $n^W$), the original coordinates of the point $p^L$ and the normal unit vector $n^L$ in the local sensor reference frame, the relative timestamp t and the index ID of the cloud that originates it. It can be noticed that, given the cloud index and a trajectory, local coordinates of points and normal are redundant information, but the inventors prefer to store them to avoid recomputations.

The inventors also propose to employ two maps $M_l$ and $m_g$, respectively a local and a global map. $M_l$ is used by the odometer and the local trajectory optimizer modules. When one needs to remove points from $M_l$ one moves them to the global map instead. Moreover, at each step of the local optimizer, the selected correspondences used in the generalized ICP are added to a list $L_c=\{[p_{q_i},n_{q_i},ID_{q_i},t_{q_i}], [p_{NN_i}, n_{NN_i},ID_{NN_i},t_{NN_i}]\}$, $i=1:N_L$, where for each query point $p_{q_i}$ taken from cloud $ID_{q_i}$ with its associated normal $n_{q_i}$ and timestamp $t_{q_i}$ one retrieves from $M_l$ data associated to the nearest neighbor used at the last step of the optimization: its position $p_{NN_i}$, normal vector $n_{NN_i}$, cloud index $ID_{NN_i}$ and timestamp $t_{NN_i}$. Note that all the information is in local coordinates of the sensor.

Having local information in the map is fundamental at this step and memory requirements remain low given that one does not need to store entire clouds, but only the points that are added to the map at each step. It has to be noticed that the list $L_c$ has to be populated after each step of the local optimizer, since addition of new clouds may overwrite old points in the map.

Similarly, one creates a list of all the poses $L_\Gamma=\{\Gamma_i\}$ associated to the clouds by stacking the poses refined by the local optimization step. Notice that given $N_c$ clouds, the pose list contains $N_c+1$ elements. The global trajectory optimization is performed by minimizing $$e(L_c, L_\Gamma) = \sum_{i=1}^{N_L} [(p^W_{q_i} - p^W_{NN_i}) \cdot n^W_{NN_i}]^2 \tag{5}$$

where $$p^W_{q_i} = \Gamma^W_{q_i} \otimes p_{q_i}$$

$$\Gamma^W_{q_i} = \Gamma_{ID_{q_i}} \cdot \exp(t_{q_i} * \log(\Gamma^{-1}_{ID_{q_i}-1} \cdot \Gamma_{ID_{q_i}}))$$

$$p^W_{NN_i} = \Gamma^W_{NN_i} \otimes p_{NN_i}$$

$$n^W_{NN_i} = \Gamma^W_{NN_i} \otimes n_{NN_i}$$

$$\Gamma^W_{NN_i} = \Gamma_{ID_{NN_i}} \cdot \exp(t_{NN_i} * \log(\Gamma^{-1}_{ID_{NN_i}-1} \cdot \Gamma_{ID_{NN_i}}))$$

The objective function in Equation 5 still represents a generalized point-plane ICP, where both the query and the model point are expressed in local coordinates and transformed into world coordinates with the poses associated to their clouds and the interpolation timestamps.

Optimizing Equation 5 with Gauss-Newton still results in a sparse approximated Hessian matrix, since each term of the summation involves only three (when $ID_{NN_i}=ID_{q_i}-1$) or four poses of the entire trajectory, but the matrix is not tridiagonal block, since two points from the same cloud can be associated to points of different clouds. For this reason the inventors employ a graph optimization approach, as proposed in R. Kuemmerle, G. Grisetti, H. Strasdat, K. Konolige, and W. Burgard, "g2o: A general framework for graph optimization," in *ICRA*, 2011.

To reduce computation time it is proposed to never recompute feature associations, assuming that features are properly matched by the local trajectory optimizer. Once the optimization is terminated both the global and the local map are updated by computing the world coordinates of all features.

This optimization can be applied to a complete sequence of clouds to refine an entire trajectory. Moreover, in presence of loop detections, the correspondences representing the loop allow estimating a trajectory that refines the entire poses, constraining the loop to close correctly.

Notice however that such global optimization is not suitable for real-time computation, since it involves all the poses and all the associations performed along the entire trajectory.

Nevertheless it shows that, by retaining the proper information, the present data structure can be employed for global optimization and loop closures. Global trajectory refinement could be performed more efficiently with pose graph optimization solutions, like the one presented in M. Nießner, M. Zollhöfer, S. Izadi, and M. Stamminger, "Real-time 3d reconstruction at scale using voxel hashing," *ACM Transactions on Graphics*, 2013, but the ability of maintaining big maps in memory is a key factor to recreate the maps after loops are closed.

A.4. Experimental Results

The inventors tested the system on real datasets acquired using a Velodyne HDL-32E. A first dataset was acquired by an operator carrying the sensor while exploring an indoor environment of about 10×35×3 meters. Similarly, a second dataset was acquired in an indoor industrial building of about 16×65×10 meters. A third dataset was acquired with the sensor mounted on the roof of a car while driving in normal traffic conditions performing four loops in a town district, each one about 500 meters long. Moreover, the inventors evaluated their framework against the publicly available Kitti datasets (H. Strasdat, "Local accuracy and global consistency for efficient slam." Ph.D. dissertation, Imperial College London, 2012) that provides car mounted Velodyne HDL-64E acquisitions taken in various urban environments and at various speeds. The Kitti training datasets also makes available a GPS measured ground truth of each single track. The provided 3D point clouds, though, have been already unwarped using the estimated motion of the on-board odometry system. For this reason the inventors made use of only those training tracks for which the native raw data was available.

The local trajectory optimization can be employed to generate high definition local 3D models of the acquired environments. To verify the quality of the generated models, the inventors have processed the two indoor datasets using a voxel resolution of 1 cm with a threshold to trigger the local optimization of 2 m. This results in approximately 8 million of points for the first dataset and approximately 24 million for the second. Then, a reference model has been created by pairwise registering scans of the environment taken with the high resolution ZF 5010C scanner using the method of J. Yao, M. R. Ruggeri, P. Taddei, and V. Sequeira, "Automatic scan registration using 3d linear and planar features," *3D Research*, vol. 1, no. 3, pp. 1-18, 2010. The inventors have accurately registered the two models and computed the point-point distances between them. No visible distortions are present in the models and the histograms of the distances between the two clouds have peaks lower than 0.02 m, which is within the nominal accuracy of the Velodyne HDL-32E sensor used.

Figure 2:
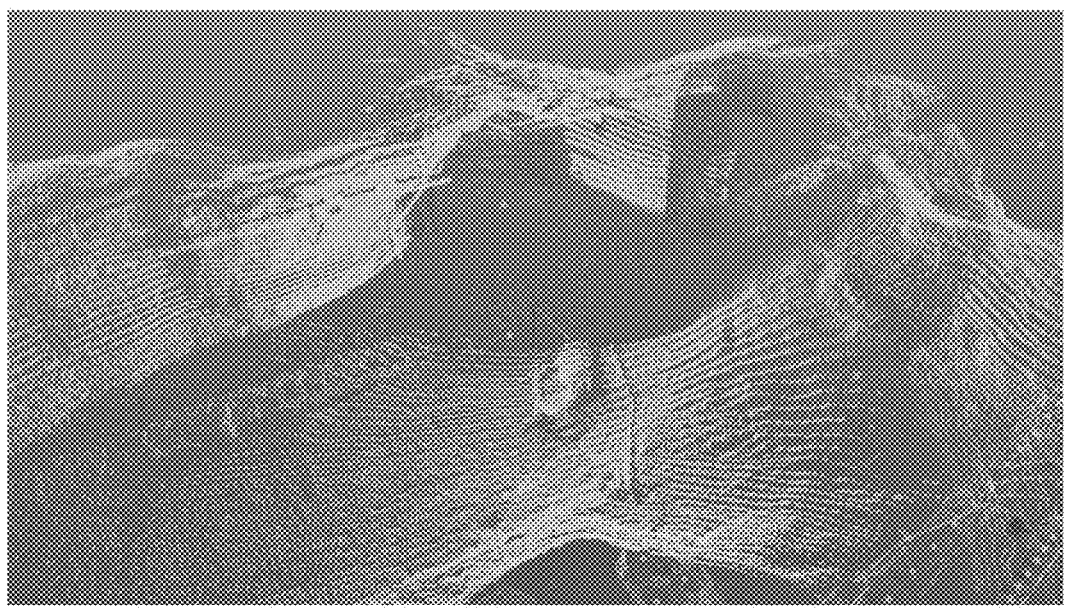
FIG. 2: Snapshot (black-and-white of an originally colored snapshot) of the user interface as it is provided to the user in real-time. It shows a tunnel environment which has been scanned at two points of time. In the actual color display, green indicates no change between the acquisitions and red indicates new constructions between the two acquisitions.

To estimate the tracking quality and accumulated drift, the inventors have run the present framework on all Kitti training datasets using as input data the raw readings of the sensor (10 tracks in total). Moreover, to demonstrate the benefit of incorporating the sensor motion in the optimization framework, they have also run the present system on the same tracks but employing the official preprocessed clouds of the datasets (unwarped using the estimated motion of the on-board odometry system). In this case the inventors did not perform any unwarp during the optimization (i.e., they used only the odometry module). For these experiments they used a voxel size of 15 cm in the maps and they did not perform loop closures. FIG. 2 shows both experiment results in terms of average relative translation and rotation error generated using trajectory segments of 100 m, 200 m, ..., 800 m length (refer to H. Strasdat, "Local accuracy and global consistency for efficient slam." Ph.D. dissertation, Imperial College London, 2012 for a description of the adopted error metric). It is clear that by incorporating the cloud unwarping into the optimization framework yields better results and reduces both translational and rotational drift (in particular translation error improved by 0.3 point percentage on average). Notice that the current state of the art algorithm for the Kitti benchmark that only employs LIDAR data (LOAM) performs better. It must be noted though that it has been validated directly on the original unwarped point clouds and that it processes clouds only at 1 Hz.

Figure 3:
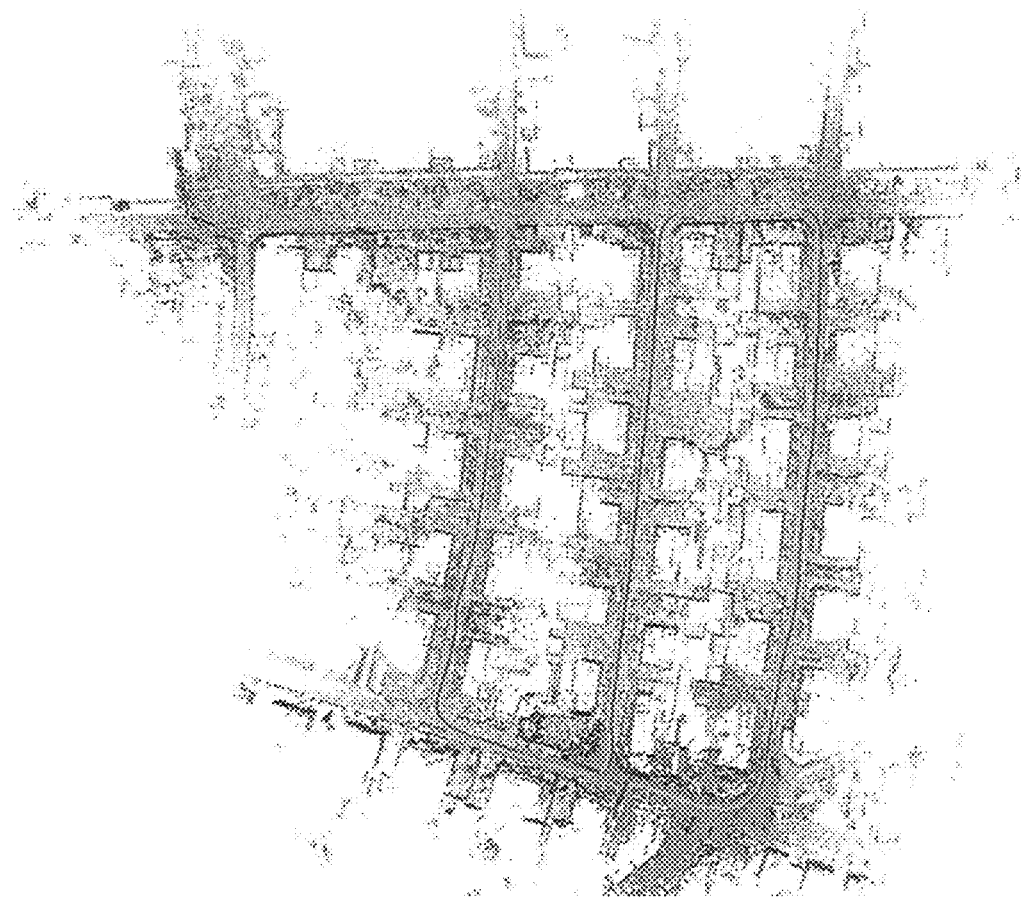
FIG. 3: Effect of the loop closure on a sample track of the Kitti datasets. The trajectory is shown as estimated on-line and as globally optimized trajectory. The (actual) map is colored according to the normal vectors of the points with a different scheme for the two maps (such as violet area being the local map).

To evaluate the improvements introduced by the proposed global optimization strategy after integrating loop closures, the inventors enabled this feature over a sample track of the Kitti dataset containing a single loop. Their loop detection mechanism is very simple and not suitable for a real application: one detects a loop when the distance between the current pose and a previous pose far in time is lower than a threshold. Then, one registers the last cloud on the global map and if this succeeds, one adds the found correspondences to the global optimization. FIG. 3 shows the effect of the loop closure in the considered track. Experimental results also showed the improvement of the global optimization over both the odometer and the local optimized trajectory.

The inventors compared their system with the publicly available Velodyne SLAM [F. Moosmann and C. Stiller, "Velodyne SLAM," in IVS, 2011] that also performs a motion compensation on the acquired point clouds. To compare the two systems the inventors measured drift accumulated using the outdoor car dataset. Since the same location is revisited multiple times, they estimated drift by registering the generated initial local map with the one generated at each subsequent passage. The translation and orientation components of the registration transform aligning the current local map to the initial one indicate how much drift has been accumulated. One of the salient characteristics of [F. Moosmann and C. Stiller, "Velodyne SLAM," in *IVS*, 2011] is the presence of a map refinement strategy (called adaption) based on a set of heuristic tests that positively influence the trajectory estimation. Since the present system is focused on the optimization strategy by proper modeling the problem, the inventors disabled this feature in the original work to focus the analysis on the trajectory estimation. Results after each loop are shown in Table I. It can be noticed that one accumulates less drift than the original work. Moreover the present system is a natural formulation of the problem that requires less configuration parameters than the heuristic strategies of the Velodyne SLAM. Performance of the present system is superior to the Velodyne SLAM system both in terms of execution time and in the ability of maintaining a global map of the environment, while in the original work only a local map is maintained. The ability of using the global map has been confirmed, in case of the use of loop closure and the global optimization technique to correct the drift accumulated in the first loop and the use of the global map for the next loops.

In order to evaluate the performance of the proposed map representation, the inventors have measured the execution time of each operation while running the outdoor car dataset on a PC equipped with an Intel Xeon E5-2650 CPU.

As expected, addition operations are performed in a linear time w.r.t. the number of features added to the map, being the average time 36.4 ns per feature, which gives an average cloud insertion time of 1.81 ms for the HDL-32E sensor.

Delete operations in the present SLAM framework are only performed over the local map, just before updating the kd-tree.

TABLE I

Drift error reports

| loop | yaw | pitch | roll | dx | dy | dz |
|---|---|---|---|---|---|---|
| Local trajectory optimizer | | | | | | |
| 1st | −1.4° | −0.7° | −0.0° | −0.62 m | −0.26 m | 0.39 m |
| 2nd | −2.7° | −0.3° | −0.1° | −1.16 m | −0.86 m | 0.89 m |
| 3rd | −4.2° | −0.4° | −0.7° | −1.17 m | −1.16 m | 1.80 m |
| 4th | −5.5° | −0.8° | −1.0° | −2.37 m | −1.45 m | 2.33 m |
| Velodyne SLAM | | | | | | |
| 1st | 3.33° | 0.05° | −0.9° | 1.53 m | 0.80 m | 3.60 m |
| 2nd | 6.54° | 0.3° | −1.7° | 2.97 m | 1.82 m | 7.29 m |
| 3nd | 9.96° | 0.5° | −2.5° | 4.54 m | 2.87 m | 11.04 m |
| 4nd | 13.2° | 0.9° | −3.0° | 5.93 m | 4.16 m | 14.54 m |

Features to be deleted are selected by performing a radius search around the point of interest (e.g. the last estimated sensor pose) and added to the global map. Results show a constant deletion time per feature that takes on average 30.84 ns.

Figure 4A:
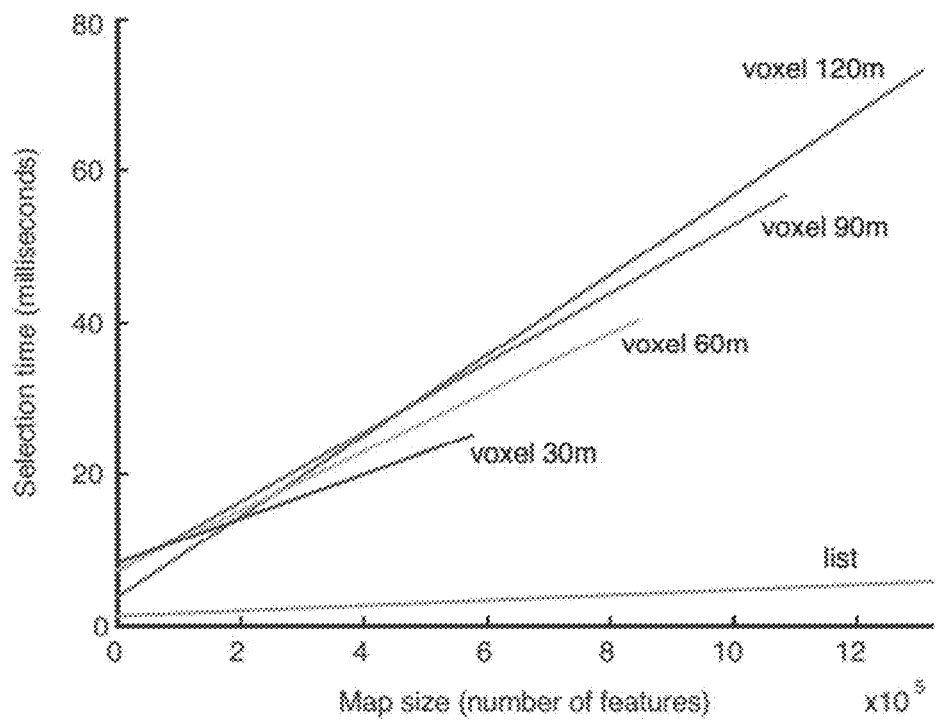
FIG. 4: Point selection time for both local map (typically containing less than 1M features) and global map (typically containing more than 1M features), FIG. 4(a) Local map point selection time for different search radius and FIG. 4(b) Global map point selection time for different search radius.

Selection of features to be deleted from the local map can be performed in two manners: by using the voxel structure or by iterating over the dense list. FIG. 4(a) shows the average search times based on the number of features stored in the map and the search radius. As it can be noticed, using the dense list always provides the same performance (linear to the number of features stored, independently of the search radius). On the other hand, voxel search times increase as the radius does and, in all the cases, present worst results.

Since no points are deleted from the global map, compact operations only happen in the local one. Thanks to the proposed strategy of postponing the addition of new clouds until a new kd-tree is requested, only 7.79% of the times the number of holes created is greater than the number of features added, being necessary to perform a compact operation. In these cases, execution times show a linear behavior w.r.t. the number of holes remaining, being the average time of each operation 1.81 ms.

Figure 4B:
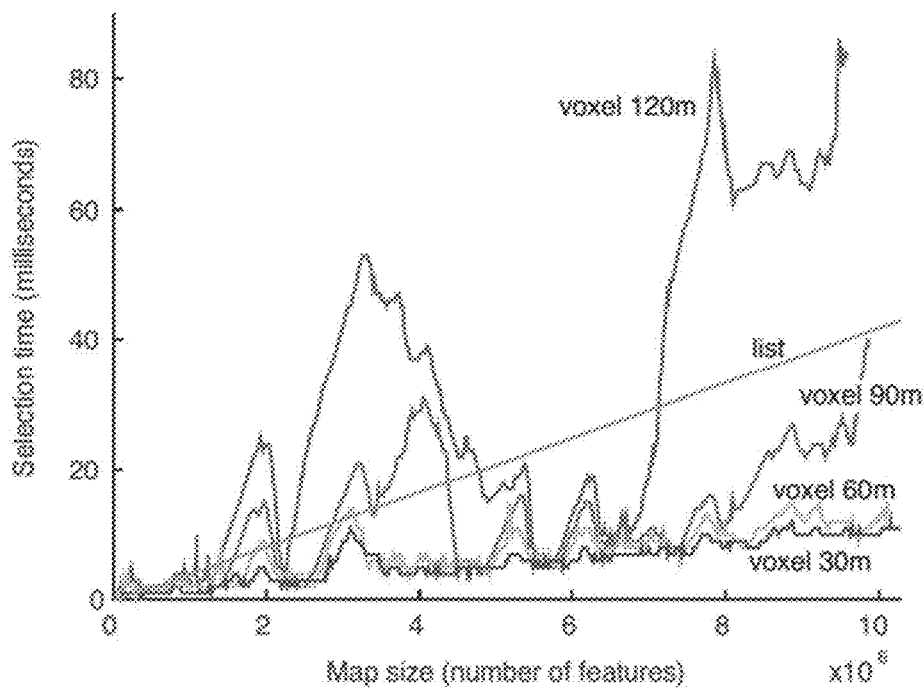

Finally, for loop closure operations, the global map has to be queried around an interest area. As happened with the local map, this selection can be performed in two manners. FIG. 4(b) shows the results of using the voxel structure and the dense list. As it can be noticed, for search radius under 90 meters, the voxel over-performs the dense list. However, as the radius grows, caching fails in the internal sparse voxel structure lead to a great performance loss.

The system is able to process clouds at 12.93 Hz (i.e., in real time w.r.t. the Velodyne acquisition rate) when the local trajectory optimization is not active, while the frequency decreases to 7.5 Hz using the local trajectory optimization, which is close to real time. It has to be noticed that the registration and the local optimization are not coded to run in multi-thread, thus the inventors expect that performance can be increased both in the odometer and in the local optimization.

In the odometer mode the time spent in registering clouds is the 54% of the total, while in the local optimization mode 30% of the time is spent for the odometer registration and 35% for the local trajectory optimization. The registration includes the nearest neighbor search time, while the impact of each operation performed over the local and global maps is summarized in Table II, when working on odometer mode (first row) and when performing the local trajectory optimization (second row). Addition, deletion and compact operations on the local map are shown in columns add, delete and compact, respectively, where deletion times also include the point selection over the local map and the addition to the global map. The impact of building the kd-tree over the entire local map is shown in the column kd-tree and, finally, the impact of adding the deleted points of the local map into the global map is shown in the column add g.

TABLE II

System performance

| | freq. | add | delete | compact | kd-tree | add g. |
|---|---|---|---|---|---|---|
| Odom. | 12.93 Hz | 2.1% | 0.9% | 0.2% | 25.0% | 0.3% |
| Local | 7.54 Hz | 1.2% | 0.5% | 0.1% | 13.7% | 0.2% |

A.5. Conclusion

The present document presents a framework for local optimization of point clouds acquired using moving lasers. In particular the inventors incorporated the acquisition motion into the optimization by interpolating each acquired point cloud between its starting and ending position. The inventors experimentally showed, using publicly available datasets, that by correctly modelling the sensor movement it is possible to reduce odometry estimation errors.

Moreover, they present an efficient data structure to manage large voxelized 3D maps constituted by sparse features. The map data structure is suited for both local map optimization and for offline global optimization. Their experiments show that, for the former problem, such a structure provides real-time odometry and nearly real time local refinement. These performances may even be enhanced by taking advantage of multi-thread operations when local trajectory optimization is performed (e.g., nearest neighbor search, cloud unwarping).

B. Localization, Tracking and Change Analysis Based on 3D Reference Model

Approaches based on octrees or kd-trees provide reasonable searching times for nearest neighbors (typically logarithmic w.r.t. the map size) and good scalability. In their approach the inventors introduce an alternative voxel representation that combines the fast random accesses provided by dense voxel representations and the scalability provided by sparse data structures.

In order to ensure a correct pose tracking, a preferred system performs an efficient selection of points to be used in the registration process that ensures good geometric stability for the ICP algorithm. Then, a strategy to efficiently discard outliers ensures that registration is performed only using correspondences that are globally consistent (inliers).

The present preferred framework fuses in the registration process w.r.t. the ground truth model a robust odometer that is capable of real time tracking even when the user leaves the map or if the observed environment differs too much from the initially acquired model (e.g. furniture were changed). By re-entering the known map the system automatically recovers the correct position and thus avoids drift accumulation.

B.1. Main Benefits of the Preferred Embodiments Described Below

1) A scalable place recognition strategy to localize the sensor in very large environments using a set of pre-computed descriptors and avoiding accesses to the ground truth map.
2) An efficient data structure to represent the map that provides constant time nearest neighbor searches and a low memory footprint.
3) A fast point selection strategy that ensures geometrically stable results.
4) An inlier selection technique that efficiently removes the interference of outliers during the registration process.
5) A fusion between a local odometer and the registration against the ground truth map that exploits static outliers and allows the user to navigate through non-mapped areas.
6) A complete system that provides real-time results with high accuracy.

The description below is structured as follows: Section B.2. presents a preferred online place recognition and relocalization strategy, Section B.3. shows how to perform online tracking once the user pose has been identified in a known environment. Then Section B.4. presents experimental results and finally Section B.5. draws the conclusions.

B. 2. Place Recognition

The place recognition component deals with recovering an initial estimate of the user location and orientation without a priori information. It is able to run online at frame rate to provide candidate locations given the current sensor observation. Moreover, for scalability purposes, it should not make use of the map model during execution since it might provide candidate poses related to distant locations (and thus not loaded in memory), or even different maps. In order to satisfy these two requirements, a pre-processing stage is preferably introduced in order to (1) reduce the search space of available poses and (2) train a robust and compact classifier that, given an observation, efficiently estimates the possibility of being in a specific location.

Search Space Reduction

One initially preferably detects navigable areas amongst the entire map. These areas are defined as the volume where the sensor can be placed during the exploration of the environment. Moreover one may generally assume without loss of generality that the map model Z axis is roughly aligned with the gravity vector.

Since the inventors focused on ground motion (backpack or vehicle mounted sensor), navigable areas are expected to be in a relatively narrow space over the navigable floor. For this reason, one firstly identifies the extents of the floor. Floor extraction is performed over a sparse voxel representation of the environment, V, where each full cell, $v^{(i)}$, contains a normal vector to the surface locally defined by the points around its centroid, $\bar{n}^{(i)}$. One extracts a subset of voxels that represent candidate floor cells, $F \subseteq V$, by checking that the vertical component in their associated normals is dominant, i.e. $\bar{n}^{(i)} \cdot (0,0,1)^T \geq \varepsilon$, where $\varepsilon$ is typically a value between 0.5 and 1. However, this constraint alone may lead to classifying too many cells as floor (e.g. tables or empty shelves).

To address this problem, the inventors propose to introduce the concept of reachability. Given a reachable cell $f \in F$, all surrounding cells $(g^{(1)}, g^{(2)}, \ldots, g^{(m)}) \in F$ are considered as reachable if the following conditions are satisfied:

$$\|f - g^{(i)}\| \leq \theta_0 \quad (6)$$

$$\|f_z - g_z^{(i)}\| \leq \theta_1 \quad (7)$$

$$C_{g^{(i)}} \cap V = \emptyset \quad (8)$$

where $\theta_0 \geq V_{cellSize}$ in (6) stands for the maximum step distance (e.g. 0.5 meters for a walking motion, or $V_{cellSize}$ for a car motion), $\theta_1$ in (7) stands for the maximum vertical step size and $C_{g^{(i)}}$ in (8) stands for the simplified volume of the observer, centered over the floor cell $g_i$ (a bounding cylinder in the present implementation).

Initial reachable cells can be provided manually but, since the generation of the map is preferably performed by placing the scanner over reachable cells, this initialization can be automatically performed assuming floor cells below the acquisition positions as reachable.

According to these conditions, detecting all floor cells $F^* \subseteq F$ is performed in a flooding-algorithm style, as illustrated in Table III showing algorithm where, initially, A stores the first set of reachable cells.

TABLE III

Flooding floor extraction.

```
Require: A ≠ Ø, F ≠ Ø, F ∩ A = Ø
F* ← Ø
While A ≠ Ø do
    B ← Ø
    While A ≠ Ø do
        a ← A .pop( )
        F* .push( a )
        For all f ∈ F do
            t₁ ← ||f − a|| ≤ θ₀
            t₂ ← ||f_Z − a_Z|| ≤ θ₁
            t₃ ← C_f ∩ V = Ø
            If t₁ and t₂ and t₃
                F .remove( f )
                B .push( f )
            End if
        End for
    End while
    A ← B
End while
Return F*
```

Once the floor has been identified, navigable space, N, is defined as the set of cells, $n^{(i)} \in N$, above floor cells where $n^{(i)} \cap V = \emptyset$.

In order to further reduce the navigable space without loss of precision, the inventors also propose to introduce physical constraints related to particular operability of the system (e.g. vertical and angular limits on the possible sensor pose for a specific sensor mounting) that provides an effective navigable space $N^* \subseteq N$. Such constraints are empirically selected by running a set of experiments on sample datasets (see Section B.4.).

Pose Classifier

In order to build a pose classifier one initially needs to define a compact representation of each single observation. In particular the inventors adopt the simple and fast-to-compute compact descriptor defined by Taddei, P., Sánchez, C., Rodríguez, A. L., Ceriani, S., Sequeira, V., 2014. Detecting ambiguity in localization problems using depth sensors. In: 3DV: one splits the range image in $W_b \times H_b$ regular bins and, for each one, one estimates a median range value. All these values are stacked in a descriptor of the observed frame d.

One then randomly generates a set of training poses $\Gamma_T = \{\Gamma_{T_0}, \ldots, \Gamma_{T_i}, \ldots, \Gamma_{N_T}\}$ in the known effective navigable space $N^* \subseteq N$. For each pose $\Gamma_{T_i}$ one synthesizes a depth image by ray-casting the 3D map to a sensor image plane aligned to the provided pose and the inventors extract its descriptor $d_{T_i}$ from the generated depth image. One builds a kd-tree $T = \{d_{T_i} \to \Gamma_{T_i}\}$ that maps all generated descriptors $d_{T_i}$ to their corresponding pose $\Gamma_{T_i}$. Given a descriptor q, the set of location/descriptor pairs that are close in the descriptor space can be retrieved by performing efficient searches on T, with logarithmic complexity in the descriptor space. Notice that, given the set of training samples $\{d_{T_i} \to \Gamma_{T_i}\}$, it is also possible to build more compact classifiers, e.g. as described in Glocker, B., Izadi, S., Shotton, J., Criminisi, A., 2013. Real-time rgb-d camera relocalization. In: ISMAR. Nevertheless the inventors experimentally observed that N* was small enough to retain the full training set in memory and to perform classification by radial nearest neighbor searches in the descriptor space of the kd-tree.

During execution the pose classifier is used to recover the most possible locations given the current observation. In particular, the inventors split the process in two different stages: the initialization, which deals to the estimation of possible locations when no a priori information is available and the update, which deals with the evaluation of candidate locations and the resampling of them.

In the initialization step one needs to draw a set of possible location of the sensor given a single sensor observation. The inventors propose to proceed as follows:

1. Given the last sensor observation one computes its associated descriptor q and recovers a set of candidate locations $\Gamma$ performing a radial search on T given a threshold r in the descriptor space. In case of sensors providing 360 horizontal field of view, one may increase the candidate locations by computing additional input descriptors by horizontally shifting the range values. Each descriptor corresponds to the readings that the sensor would produce if rotated by on its local axis. Each resulting set of candidate locations are then rotated according to i.

2. One associates a weight $w_{\Gamma_p}$ to each potential location $\Gamma_p \in \Gamma$:

$$w_{\Gamma_p} = 1 - \frac{\|d_p - q\|}{r},$$

where $d_p$ is the descriptor associated to the location $\Gamma_p$ retrieved from T. $w_{\Gamma_p}$ is 1 for perfectly matching descriptors and 0 for descriptors on the search sphere boundary.

3. Finally, weights are collected in w and normalized to have max w=1.

The update stage deals with the update of the possible locations $\Gamma = \Gamma_0, \ldots \Gamma_N$ while the sensor moves given their associated weights $w = w_0, \ldots, w_N$. Notice that this step makes use of an odometer that registers one cloud to its predecessor according to the technique explained in the next section. In particular the inventors proceed as follows:

1. One uses the odometer and the current observation to update all locations in $\Gamma$.

2. When a given distance is travelled since last potential locations were created, a new descriptor q is computed from the last observation. This is used to retrieve from T a set of possible locations, similarly to step 1 in the initialization stage.

3. The weight associated to each possible location $\hat{\Gamma}_j \in \hat{\Gamma}$ is computed as:

$$w_{\hat{\Gamma}_j} = \frac{\Pi(q|\hat{\Gamma}_j)\Pi(\hat{\Gamma}_j)}{\Pi(q)}. \tag{9}$$

and once all weights have been computed, they are normalized to have a maximum value of 1.

4. One updates $\Gamma = \hat{\Gamma}$ and $w = w$ and repeats the iteration of the update stage.

Equation (9) computes the weight associated to each possible location using the Bayes theorem expressed in possibility theory alike in Dubois, D., 2006. Possibility theory and statistical reasoning. Computational Statistics and Data Analysis 51 (1), 47-69, the Fuzzy Approach to Statistical Analysis. Individual terms of (9) are:

$$\Pi(q|\hat{\Gamma}_j) = 1 - \frac{\|d_j - q\|}{r} \tag{10}$$

$$\Pi(\hat{\Gamma}_j) = \max_{\substack{k=1 \ldots N \\ d(\Gamma_k, \hat{\Gamma}_j) \leq 1}} w_k * (1 - d(\Gamma_k, \hat{\Gamma}_j)) \tag{11}$$

$$d(\Gamma_k, \hat{\Gamma}_j) = \frac{\|\Gamma_k - \hat{\Gamma}_j\|}{d_{max}} \tag{12}$$

$$\Pi(q) = \frac{\hat{N}}{N_T} \tag{13}$$

Equation (10) estimates the possibility of the descriptor q, given the pose $\hat{\Gamma}_j$ in the same way as in step 2 of the initialization stage (In case of multiple input descriptors, each must be taken into account individually). Equation (11) evaluates the likelihood of being at pose $\hat{\Gamma}_j$ by finding the most compatible location in the set of potential locations $\Gamma$. This compatibility is defined as the weighted relative distance (Equation (12)) between the previous potential pose $\Gamma_k$ and pose $\hat{\Gamma}_j$. Equation (13) estimates the distinctiveness of the current observation by comparing the number of neighbors retrieved w.r.t. the size of the training set, e.g. extremely ambiguous poses like in corridors will produce lots of results, resulting in high ambiguity.

The update stage is iterated until potential poses converge to a single location, i.e. when the covariance of the centroid of F computed according to weights w is small. At this point one considers the problem solved and the pose tracking component is started.

The preferred system outlined above is based on an iterative re-weighting of possible locations with fast bootstrapping that uses a single sensor observation. A key factor for scalability to large maps is the pre-computation of lightweight descriptors from the reference maps and their organization in a kd-tree structure with associated poses. This way, queries in the descriptor space are used to efficiently populate the system with candidate locations given the first observation. Then, in subsequent update steps the estimated motion and queries in the descriptor space are used to draw a new set of possible locations and their associated weights.

This approach is comparable with the general Monte Carlo Localization techniques presented in [Thrun, S., Fox, D., Burgard, W., Dellaert, F., 2001. Robust monte carlo localization for mobile robots. Artificial intelligence 128 (1), 99-141] and [Thrun et al. (2005) Thrun, Burgard, and Fox] that make use of particle filters. However their techniques aim at precisely estimating the sensor probability distribution by approximating it with a set of weighted particles in order to solve all stages of the localization problem [Thrun, S., Burgard, W., Fox, D., 2005. Probabilistic Robotics (Intelligent Robotics and Autonomous Agents). The MIT Press].

The present place recognition component, instead, only needs a fast and rough pose estimation, since precise pose tracking is performed by the subsequent tracking component (Section B.3.) once a unique location has been identified. Moreover, the present system only has to ensure that possible locations are not discarded and thus does not require a precise sensor pose probability density estimation. For this reason, one does not require a dense sampling of the navigable space, as Section B.4. shows. However a low sampling density may lead to tracking loss in certain cases due to wrong particle initialization. This problem is overcome by drawing a new set of particles each time the update stage is performed.

B.3. Pose Tracking

The pose tracking component deals with computing the local motion of the sensor as it moves around the environment. Knowing the previous estimated pose, when a new acquisition is received, the inventors perform a local registration between the map and the observed points. From the resulting transformation, the implicit motion is inferred and applied to the previously estimated pose.

To accurately track the sensor pose in real-time, it is important (1) to employ a data structure specifically designed for nearest neighbour searches and (2) to correctly select a stable and representative subset of the input points to perform the registration. Nevertheless, in order to ensure correct estimations, (3) outliers have to be properly detected. This is particularly important in degenerate environments which contains few large dominant directions, e.g. long corridors, tunnels or symmetrical environment where there are few proper points to hinder erroneous registrations.

Map Representation

Figure 5:
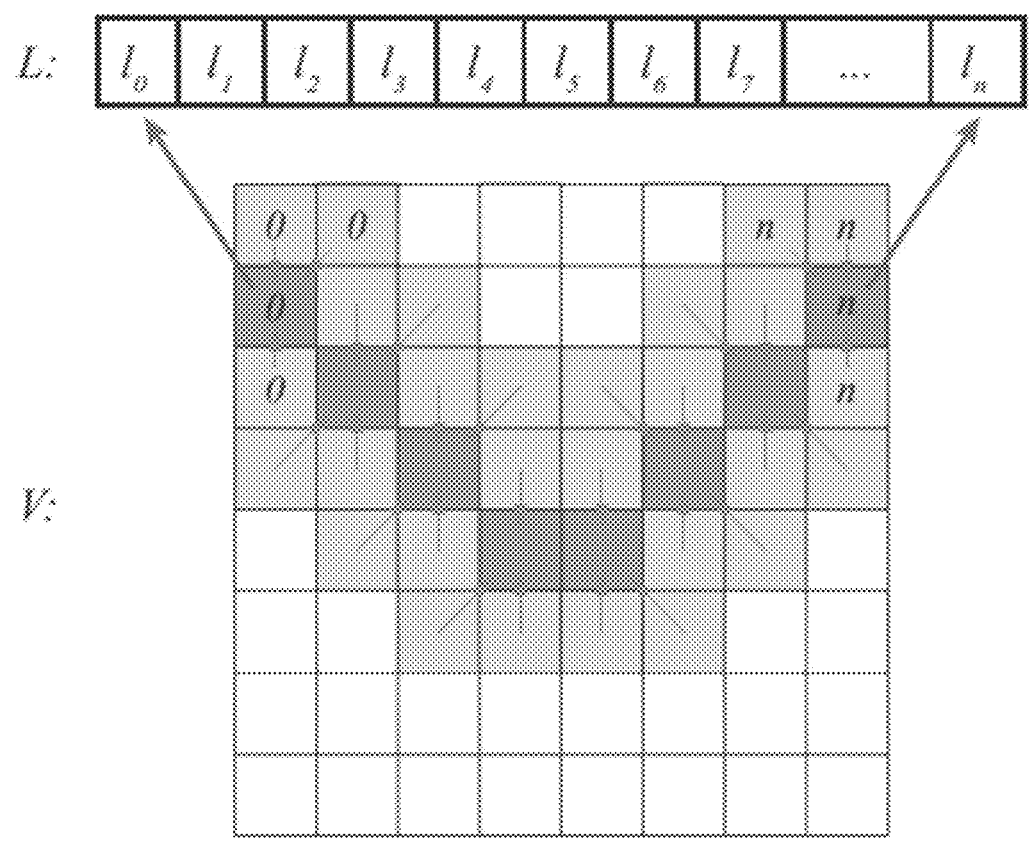
FIG. 5: Preferred embodiment of proposed map representations. Full cells are displayed as dark gray boxes. Near cells are represented as light gray boxes with a line connecting their centroid with the associated nearest neighbor. Empty cells are displayed as white boxes.

In the presently proposed map structure, two different lists of elements are stored and synchronized: a compact list of planes, L, and a dense grid of voxels, V, built with a specific voxel size. Each plane $l_i \in L$ stores a position in world coordinates, $p_i$, and a unit normal, $\bar{n}_i$. Each voxel, $v_i \in$ stores a current state that can be either full, empty or near. Full voxels store an index to the plane $l_{v_i} \in L$, whose associated position falls into. In particular reference map points belonging to the voxel are used to estimate the plane parameters. Empty cells store a null reference and near cells store an index to the plane $l_{v_j} \in L$ whose associated position distance $d_v$ to the voxel centre is the smallest. Notice that the inventors preferably consider near voxel only if the distance $d_v$ is under a given threshold $d_{max}$, otherwise the voxel is considered empty. FIG. 5 illustrates the proposed representation.

With this map representation, all nearest neighbour searches are pre-computed offline and stored inside the dense grid. At run time, given a query point in world coordinates, the inventors approximate the computation of its nearest neighbour in the map by calculating the voxel that contains it. Then, if the cell state is full or near, one returns the associated plane. Otherwise, one notifies that there are no neighbors.

Notice that, for the proposed approach (1) all operations performed during a single search present a constant execution time, regardless of the size of the map. In comparison kd-tree structures provide, on average, logarithmic times w.r.t. the size of the map. Moreover, by properly setting $d_{max}$ one (2) implicitly performs an initial outlier rejection of correspondences that are too separated when looking for nearest neighbours in ICP.

The main disadvantage of using dense voxel structures for representing large environments consists in their memory footprint. The inventors solve this problem using a three-level hierarchical structure where intermediate nodes are blocks of 32×32×32 nodes. This way, when a node is completely empty, it does not have to be stored and, given the proposed leaf size, $2^5 \times 2^5 \times 2^5$, one can address each single internal cells using only two bytes, plus an extra bit to mark empty ones (15+1 bits). Additionally, the present implementations allow streaming so that only the part inside the range of the sensor has to be in memory. Since the sensor moving speed is orders of magnitude below the associated load operations, on-line execution memory requirements are always bounded and the map is always updated around the sensor pose.

Point Selection Strategy

One should ensure that the selected subset of points of the current acquisition is representative enough to correctly lock the less defined degrees of freedom during the registration. Similarly to the work described in [Gelfand et al. (2003) Gelfand, Ikemoto, Rusinkiewicz, and Levoy], the inventors consider the contribution of moving a point, $p_i$, and its associated normal, $\bar{n}_i$, by a transformation vector $[\Delta r^T \Delta t^T]$ on the point-plane distance. This can be expressed as:

$$\Delta d_i = [\Delta r^T \Delta t^T] \cdot \begin{bmatrix} p_i \times \bar{n}_i \\ \bar{n}_i \end{bmatrix} \quad (14)$$

by linearising rotations using the small angles approximation.

Considering only rotations in Equation (14), the error introduced in the point-plane distance is proportional to the point distance w.r.t. the sensor and to the angle between its normal and the viewing ray. This leads to selecting far points and points whose normal is as perpendicular as possible w.r.t. the viewing ray. Unfortunately moving laser produces non uniformly distributed points and, in particular, distant areas are acquired with a lower point density and thus provide poorly estimated normals. Also, for circular environments when the sensor approaches the symmetry axis, angles between viewing rays and normals vanishes.

The inventors preferably solve these problems by explicitly distinguish between translations and rotations. In order to properly constrain translations, they consider only point normals. They compute the covariance matrix for translations $C_t$ as:

$$C_t = [\bar{n}_1 \ \ldots \ \bar{n}_k] \cdot \begin{bmatrix} \bar{n}_1^T \\ \ldots \\ \bar{n}_k^T \end{bmatrix}$$

and extract its associated eigenvectors $\bar{x}_1, \bar{x}_2, \bar{x}_3$, and eigenvalues $\lambda_1 \geq \lambda_2 \geq \lambda_3$. Acquisition points are then classified into three bins, $\{b_1, b_2, b_3\}$ as follows:

$$p_i \in b_j \leftrightarrow |p_i \cdot \bar{x}_j| > |p_i \cdot \bar{x}_k|, \ \forall k \neq j$$

When the three bins are balanced, the translation degrees of freedom are equally constrained. On the other hand, in degenerate cases, e.g. long corridors, one bin will be considerably less populated than the others, e.g. the one containing the points whose associated normals are parallel to the longitudinal axis.

W.r.t. orientations, one computes the principal rotation axes using cross products between positions and normals. The resulting covariance matrix is defined as follows:

$$C_R = [p_1 \times \bar{n}_1 \ ... \ p_k \times \bar{n}_k] \cdot \begin{bmatrix} p_1 \times \bar{n}_1^T \\ ... \\ p_k \times \bar{n}_k^T \end{bmatrix}$$

Similarly to translations, one calculates the associated eigenvectors $\bar{x}_1, \bar{x}_2, \bar{x}_3$, and eigenvalues $\lambda_1 \geq \lambda_2 \geq \lambda_3$. Then, points from the input cloud are classified into three bins, $\{b_1, b_2, b_3\}$ as follows:

$$p_i \in b_j \leftrightarrow |n_i \cdot \bar{x}_j| < |n_i \cdot \bar{x}_k|, \ \forall k \neq j$$

For each bin, one approximates the rotation centre as the weighted mean of the contained positions, according to their distance to the sensor (This approximation is valid for sensors. For other fields of view an alternative approximation may be required):

$$c = \frac{\sum_{i=1}^{n} \|p_i\| \cdot p_i}{\sum_{i=1}^{n} \|p_i\|}$$

and, then, for each point in the bin, one estimates how much it contributes on locking rotations over its corresponding eigenvector, x, as:

$$d_i = (1 - |x \cdot \bar{n}_i|) \cdot \frac{(c - p_i) \cdot \overline{(x \times \bar{n}_i)}}{\|p_i - c\|} \quad (15)$$

First term in Equation (15) weights the influence of a given point normal according to its perpendicularity to the rotation axis (the more perpendicular the higher the weight). The second term numerator estimates the quality on locking rotations over x by computing the angle between the vector connecting the centre of rotation to the point, and the vector perpendicular to the plane defined by the normal and the rotation axis. Finally, the denominator normalizes the result in the range [0 . . . 1], so point selection is independent from the distance to the sensor.

Figure 6:
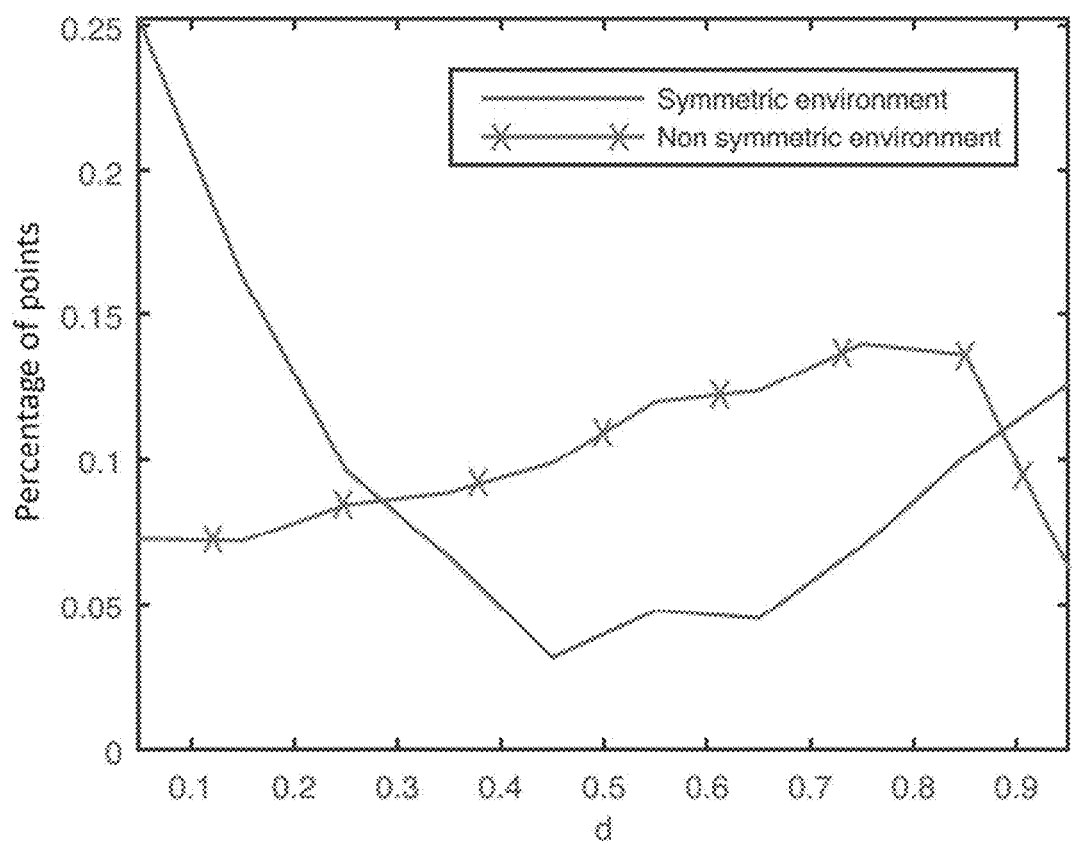
FIG. 6: Rotation histograms for a symmetric environment and for a non-symmetric one.

When bins associated with small d values contain too many points, rotations around the axis considered are poorly constrained: one needs to select only the points with the highest values. FIG. 6 illustrates this concept showing sample histograms of d values recovered from an environment with high symmetry and from another one where rotations are properly defined.

Registration and Inlier Selection

For registration purposes, the inventors consider as wrong correspondences those between sensor points (in world coordinates), $p_i^W$, and map points, $q_i$, that are inconsistent with the rest of the correspondences. This occurs when: (a) the point seen by the sensor corresponds to an object that is not present in the map (i.e. something that was added or removed after the original acquisition) or (b) the estimated $p_i^W$ is far from its corresponding point in the map. In both cases, the nearest neighbour does not make geometrical sense w.r.t. the other correspondences. Classical ways to identify these outliers employ heuristics based on relative positions and normals between corresponding points: neighbours whose distance is larger than a given threshold or with very different normal orientations are considered outliers. Examples can be found in [Rusinkiewicz and Levoy (2001)]. These approximations are useful when using high tolerance values (e.g. corresponding points further than 5 may be wrong in most cases) but, in these cases, their discriminative power is low.

The inventors initially consider the bins related to translations described above. Then they evaluate if rotations are properly defined over all the axes. If this is not the case for a given axis, they add a bin containing the points that better constrain such rotation, i.e. points with largest $d_i$ values.

Then, they consider the last estimated motion (using the two previously registered poses) to perform an initial guess on the new sensor pose:

$$\hat{\Gamma}_t = \Gamma_{t-1} \cdot (\Gamma_{t-2}^{-1} \cdot \Gamma_{t-1}) \in \mathbb{SE}3$$

Starting from this guess, each iteration of the ICP algorithm creates n random sets of points, S, where each set $s^{(j)} \in S$ contains k randomly selected points from each bin (typically k=1). For each one of these points, one computes the associated position in world coordinates, $p_i^W$, using $\hat{\Gamma}_t$ and its corresponding nearest plane in the map, $\{q_i, \bar{n}_i\}$, is searched, creating the correspondence $c_i^{(j)} = \{p_i^W, q_i, \bar{n}_i\} \in s^{(j)}$. Once all correspondences in each set are solved, the rigid transformation $T^{(j)} = [R^{(j)} t^{(j)}]$ that minimizes the expression $$E^{(j)} = \sum_{i=i}^{n} ((R^{(j)} p_i + t^{(j)} - q_i) \cdot \bar{n}_i)^2$$

is computed for each of them independently.

Considering that correspondences of each set are defined over observed points that properly lock on all six degrees of freedom, their associated rigid transformations are expected to be similar. However, in the presence of outliers and considering the reduced number of points for each set, resulting transformations will be randomly different. One may approximate the estimation error with a gaussian distribution and identify outlier correspondences by removing the sets that diverge from such distribution. One proceeds iteratively by initially considering all transformations and computing the associated normal distribution $N(\mu, \Sigma)$ where:

$$\mu = \frac{1}{n} \sum_{j=1}^{n} \gamma^{(j)}$$

$$\Sigma = \frac{1}{n} [\gamma^{(1)} - \mu \ ... \ \gamma^{(n)} - \mu] \cdot \begin{bmatrix} (\gamma^{(1)} - \mu)^T \\ ... \\ (\gamma^{(n)} - \mu)^T \end{bmatrix}$$

being $\gamma^{(n)}$ the rigid transformations associated with each set expressed as a vector, where rotations are in yaw, pitch, roll angles. Then, according to $N(\mu, \Sigma)$ mahalanobis distances for each set are computed as $$d^{(j)} = (\gamma^{(j)} - \mu)^T \Sigma^{-1} (\gamma^{(j)} - \mu) : \chi_6^2$$

and transformations with an associated probability smaller than 1% are discarded. This process is iteratively repeated (updating $N(\mu, \Sigma)$ with the remaining transformations at each step) until no transformations are discarded, or a minimum number of inlier transformations is reached. The final registration is estimated considering only the correspondences present in the sets associated with the remaining transformations.

Figure 7:
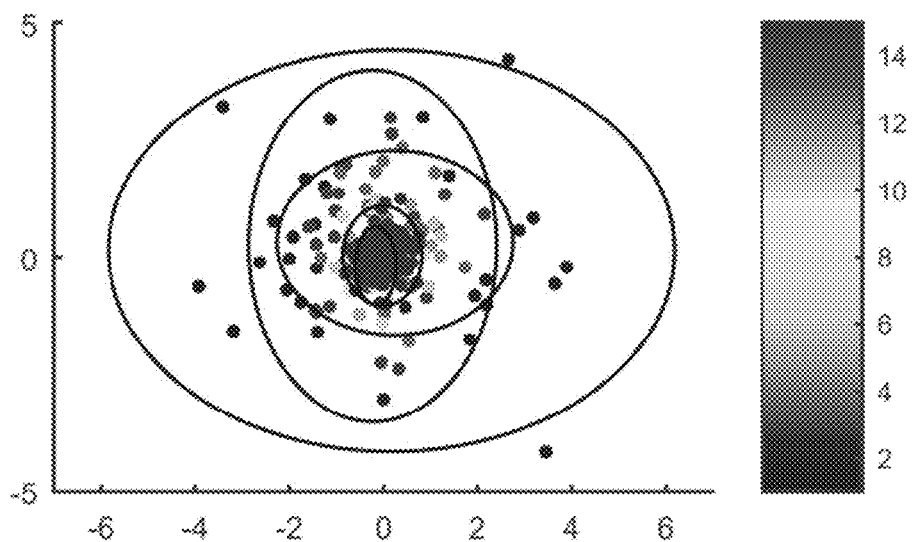
FIG. 7: Inlier selection. Axes represent the main dominant dimensions of the detected transformations. Each point represents a candidate transformation grayed according to the iteration in which they have been marked as outliers (some outlier transformations too far from the center have been omitted). Dark gray points in the central ellipses represent transformations marked as inliers. The ellipses represent the normal estimations at specific subsequent iterations.

FIG. 7 shows the results after the proposed inlier selection strategy. Notice how all independently computed transformations are distributed around a well defined central position. Also notice that, after each iteration of outlier removal, the distributions quickly converge to the final estimated transformation, when considering all the correspondences marked as inliers.

Odometer Integration

To improve the overall system robustness, the inventors preferably combine their proposed sensor tracking component with an odometer.

After a pose has been estimated, its associated points in world coordinates are stored into a kd-tree. Given a new acquisition, when the registration algorithm creates the sets of points $(p_i^W)$, it looks for nearest neighbours in both the reference map $(q_i^M, \bar{n}_i^M)$ and in the previously fixed cloud $(q_i^O, \bar{n}_i^O)$. Correspondences are, then, defined as:

$$c_i^{(j)} = \begin{cases} \{p_i^W, q_i^M, \bar{n}_i^M\} & \|p_i^W - q_i^M\| - s \leq \|p_i^O - q_i^O\| \\ \{p_i^W, q_i^O, \bar{n}_i^O\} & \|p_i^W - q_i^M\| - s > \|p_i^O - q_i^O\| \end{cases}$$

where s corresponds to the voxel cell size and compensates the different resolution between the voxelized ground truth map and the non-discretized kd-tree of the previously fixed cloud.

Main benefits are that (a) surfaces missing in the reference map can be exploited during the registration process and that (b) the system allows exploring non-mapped areas by continuously tracking the user.

B.4. Results

In order to evaluate the proposed localization and tracking system, the inventors ran several tests using four different datasets acquired with a LIDAR scanner: (a) a two floor building with a big lab downstairs and several offices on the first floor, with an approximated surface of 1400; (b) a conference building with a single floor and an approximated surface of 1800; (c) an industrial workshop with very high ceilings and with an approximated surface of 3000; (d) a large underground tunnel that can be explored by a car, and with a total length of 2.2. All models are obtained by registering the acquisitions to a common reference frame using the method of Yao, J., Ruggeri, M. R., Taddei, P., Sequeira, V., 2010. Automatic scan registration using 3d linear and planar features. 3D Research 1 (3), 1-18. The final map is generated by storing points and associated normals (and, if present, colours) after a voxel subsampling step of size 1 or 10.

For these datasets, the inventors evaluated the system using a Velodyne HDL-32E sensor mounted in three different configurations: on a backpack for walkthroughs, on a Segway and on the top of a car. Results were generated using a computer with an Intel Xeon CPU @ 2.80 GHz with 8 GB of RAM and a 64 bits operating system.

Place Recognition

Figure 8:
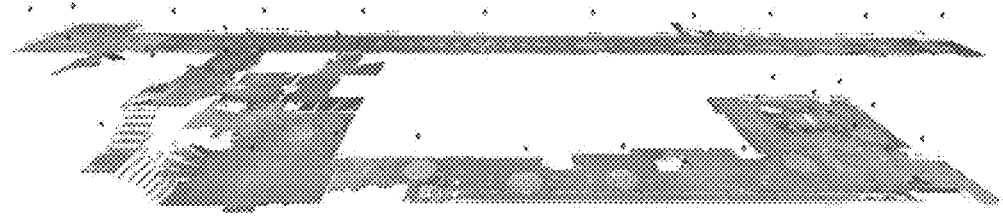
FIG. 8: Results of the floor extraction algorithm. Black points represent the scanner positions during acquisition. These locations have been used to automatically select the set of initial active cells.

In order to reduce the search space for the place recognizer, floors for all the maps were computed using the proposed flooding algorithm. At this stage, the inventors used big voxel cells (20) to perform the computations, since there is no need for a highly detailed representation of the floor limits. Average floor computation time for the three buildings was only 0.14 whilst the tunnel dataset took 3.91. FIG. 8 shows the results for the office building.

Once floors were computed, the inventors estimated the effective navigable space, $N^* \subseteq N$. In particular, for the backpack mounted application, the inventors ran several tests including normal walking over flat surfaces, running, walking on stairs and performing fast rotations. During these tests, the position of the observer was continuously tracked and logged. Some of the results achieved are presented in FIG. 8.

Figure 9:
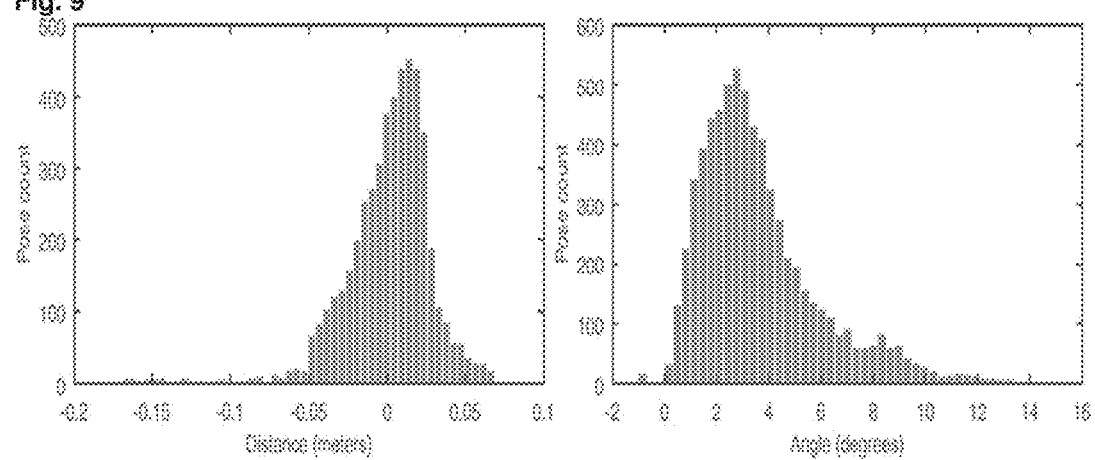
FIG. 9: Empirical parameter selection for the search space reduction. (left) deviation of the sensor with respect to the mean height to the floor observed during several walkthroughs. (right) deviation of the sensor with respect to the vertical axis (Z) observed during several walkthroughs.

FIG. 9 (left) shows the histogram of deviations with respect to the mean height above the floor. Results show a distribution with a standard deviation of $\sigma=2.97$. This way, considering that the backpack-mounted sensor stands 10 above the carrier's head, and that the human height between the 5% and 95% percentiles is in the range [150.7 . . . 188.7], according to [McDowell M A and C L (2008)], the effective height range above the floor was estimated as [154.7 . . . 204.6].

W.r.t. orientations, one considers a free motion over the z axis. The other two degrees of freedom are constrained since persons typically only bend some degrees while walking. FIG. 9 (right) shows the histogram of deviations with respect to the absolute Z axis observed during the evaluation tests (values are centered in $\mu=3.66°$ with standard deviation $\sigma=2.37°$). According to this, the present training process only considers deviations of $\pm8.41°$ to the vertical axis $(\mu+2\sigma)$.

Given these parameters, the total volume reduction on the search space (considering only positions) is shown in Table IV. Notice how, for regular buildings (office (a) and conference (b) building), the resulting search space is around 2%-3% of the total volume of the map whilst, in the workshop (c) and the tunnel (d) this ratio is considerably lower due to the high ceilings of the first, and the low density of navigable areas in the second.

TABLE IV

Navigable space reduction.

| map | volume (m³) | navigable (m³) | ratio |
|-----|-------------|----------------|-------|
| (a) | 26214.4 | 677.6 | 2.58% |
| (b) | 19660.8 | 564.3 | 2.87% |
| (c) | 1101000.5 | 669.9 | 0.06% |
| (d) | 72170864.6 | 11329.6 | 0.02% |

To measure place recognition performances alone, the inventors used five acquisition sequences and estimated the ground truth tracks by employing their tracking component with a manually initialized sensor position. They then trained a place recognition classifier jointly using the three different buildings. Each single track was then processed using the place recognition component alone (tracking based on classification). Since they did not provide information about the specific building in which the user was moving, the first candidate solutions were spread uniformly over all the three environments. During the experiments, each time the sensor moved more than 2 the place recognizer was queried. The total number of bins in the descriptor used was 12×1, and queries were performed with a radius of 6 in the descriptor space. A-priori possibilities for potential poses were computed considering $d_{max}=1$ and that locations were only comparable if their relative orientation was smaller than 45. The total size of the training set used for the three buildings was 1473 KB.

Figure 10:
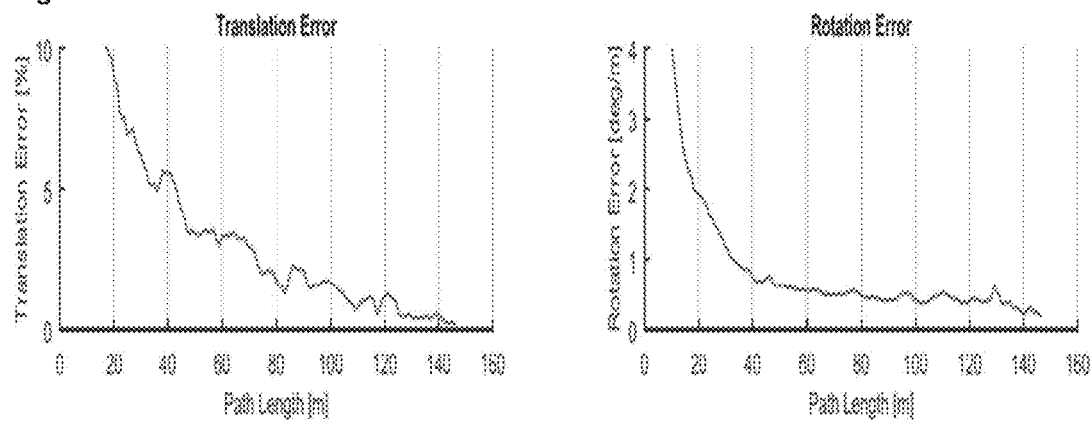
FIG. 10: Drift analysis using only place recognition (tracking by classification) where the classifier contains data related to multiple environments. The ground truth for such experiment is considered the final trajectory generated by the tracking module initialized in the correct building for a description of the adopted error metric.
Figure 11A:
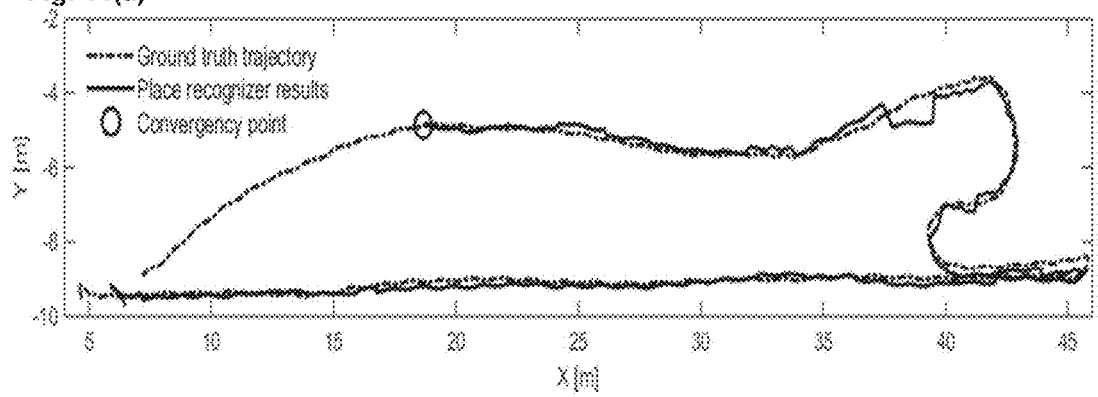
FIGS. 11(a) and (b): Two sample paths used to generate the drift analysis shown in FIG. 10. Dashed line the ground truth path estimated using the complete system. Solid line the path estimated using tracking by classification. The black circle shows the frame after which the user has been uniquely identified in a specific building.
Figure 11B:
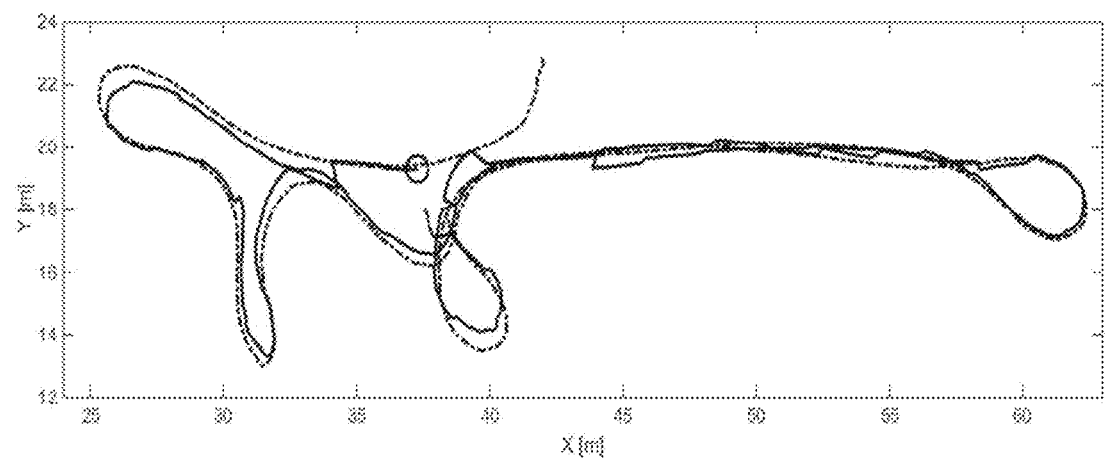
Figure 12:
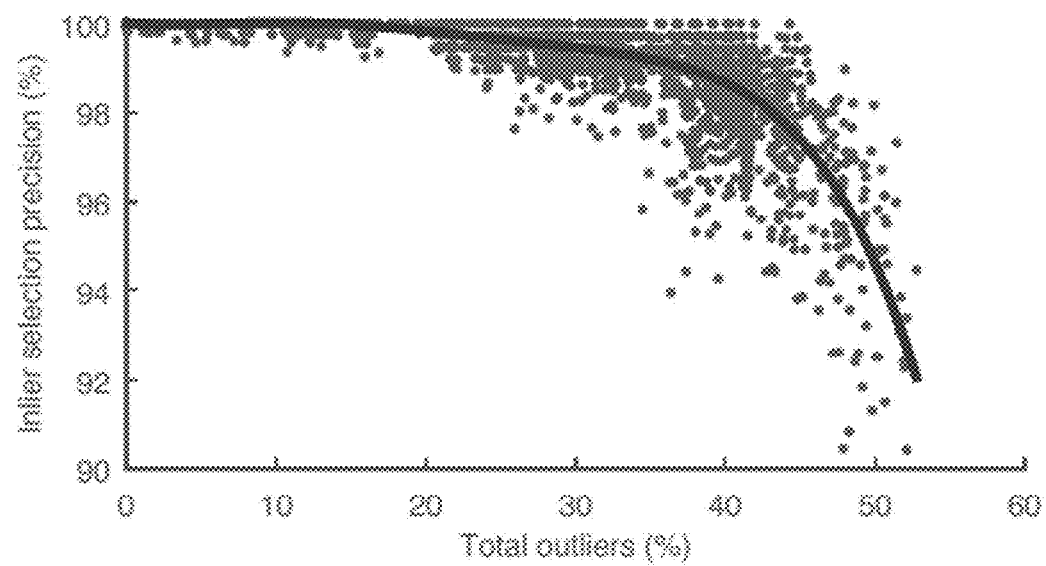
FIG. 12: Results of the proposed inlier selection algorithm.

They observed that after two or three iterations, roughly within 10 from the starting position, candidate solutions clustered in the unique correct environment and then closely followed the correct sensor position. FIG. 10 shows the drift analysis results of all the sequences employed. Notice that for each track the inventors removed the initial pose estimations related to the frames where the system still does not have enough information to uniquely identify the environment. As described by Geiger, A., Lenz, P., Stiller, C., Urtasun, R., 2013. Vision meets robotics: The kitti dataset. International Journal of Robotics Research the graphs shows the translation and rotation average drift errors given any point on the tracks after a specific track length.

Pose Tracking

The pose tracking component has been evaluated by isolating each one of its components and generating individual results (map representation, point selection, inlier selection and odometer integration) and by measuring the overall accuracy and performance of the complete system.

Map Representation

To evaluate the scalability of the proposed map representation and to compare how it performs w.r.t. standard kd-trees, the inventors measured the space requirements of loading the entire voxel structure of each dataset in memory and isolated the nearest neighbour searches in the registration process to estimate the average computation time per query.

Table V shows the memory footprint of each dataset (fourth column), considering the voxel size (second column) and the dimensions of the complete voxel structure (third column). Notice that for the industrial building (c), two cases are considered: one that extends the original map by adding information about the exterior, (c)-o, and the original map where only the interior is stored (c)-i.

It is also important to notice that, in all the cases, the voxel data structure memory size is smaller than the point cloud that generated them.

TABLE V

Map sizes for the different datasets.

| map | voxel (m) | dimensions (m) | size (MB) |
|---|---|---|---|
| (a) | 0.1 | 25.6 × 64 × 16 | 23.89 |
| (a) | 0.05 | 22.4 × 59.2 × 11.2 | 124.72 |
| (b) | 0.1 | 64 × 32 × 9.6 | 15.57 |
| (c)-o | 0.1 | 134.4 × 64 × 19.2 | 69.11 |
| (c)-o | 0.05 | 129.6 × 64 × 19.2 | 404.28 |
| (c)-i | 0.05 | 89.6 × 51.2 × 24 | 304.71 |
| (d) | 0.1 | 442 × 425.6 × 284 | 860.37 |

Table VI compares nearest neighbour searching times of the proposed map representation w.r.t. a standard kd-tree. For this test, both structures contained the same number of points and queries were performed using the same data. Results in columns 2 and 3 are expressed in nanoseconds per point and represent the average time considering all queries. Column 4 shows the average nearest neighbour error of the proposed map representation, due to the discretization of the space. Column 5 shows the total number of points in the map.

TABLE VI

Map average nearest neighbour computation times and errors for the proposed map representation compared with a standard kd-tree implementation.

| map | voxel (ns) | kd-tree (ns) | error (mm) | size (# points) |
|---|---|---|---|---|
| (a) | 53.7 | 573.3 | 0.220 | 184570 |
| (b) | 54.99 | 687.61 | 0.244 | 149030 |
| (c) | 77.32 | 744.46 | 0.083 | 1308380 |
| (d) | 69.23 | 876.26 | 0.185 | 9049443 |

Notice how, average searching times are always around 10 times faster than using kd-trees. Also notice how, the overall error in cases (a), (b), and (d), where a voxel cell size of 10 was used, is around 0.2. If this is reduced to 5, as shown in case (c), the error falls to 0.08.

Point Selection

In the experiments, the inventors observed that their point selection technique to ensure geometric stability always provided robust results. They also observed that, if this feature was not enabled, tracking was lost when navigating on corridors. However, no significant differences were detected when comparing the stability of the results w.r.t. the technique proposed by [Gelfand et al. (2003) Gelfand, Ikemoto, Rusinkiewicz, and Levoy]. On the other hand, execution times were always smaller with the present technique, since the binning strategy used avoids sorting points according to their locking capabilities.

An additional test to evaluate the point selection strategy for symmetric environments was performed. In this case, the present technique properly locked orientations by selecting correct points, but the one proposed on [Gelfand et al. (2003) Gelfand, Ikemoto, Rusinkiewicz, and Levoy] failed. In this case, the present point selection strategy is not affected by the distance between points and the sensor. This way, critical points like the ones shown in cases A and C can be selected. This fact is evident when comparing results for case B. Since the present selection is normalized according to distances, the effect of the furthest points does not compromise the selection of the closest ones.

Inlier Selection

In order to evaluate the proposed inlier selection strategy, the inventors proceeded as follows: the inventors mounted a Velodyne HDL-32E sensor on a tripod without moving it. The first frame was used as reference model and, during the rest of the experiment, outliers were progressively added (e.g., people were moving around and objects moved). This way, they could classify inliers correspondences by evaluating the distance between each point and its nearest neighbour in the reference frame.

FIG. 4 shows the final precision of the present inlier selection strategy w.r.t. the number of outliers in the input cloud. Notice how, when the total number of outliers is below 20%, the present precision is almost always 100% (no wrong correspondences are selected for registration). As the overall number of outliers increases, precision decreases. On average, the proposed experiment had 27.83% wrong correspondences, that lead to a precision of 98.97%.

Odometer Integration

Figure 13:
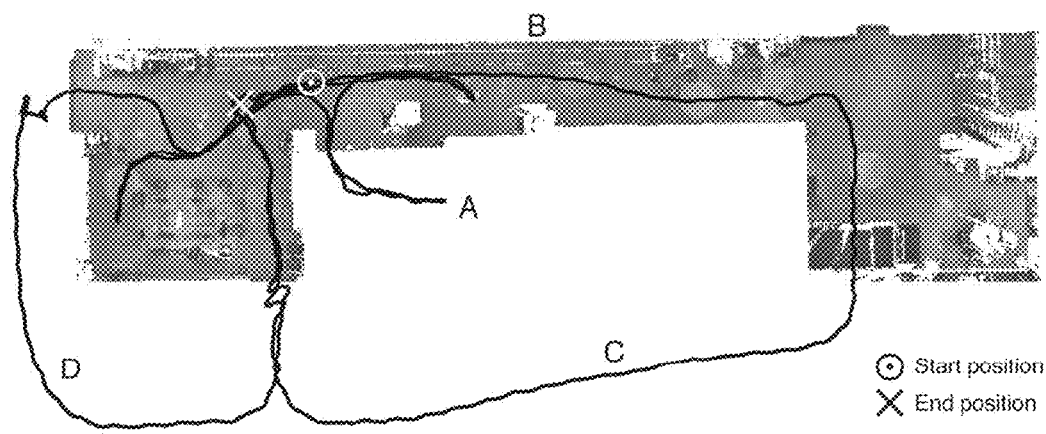
FIG. 13: Results of the odometer integration during a sample walk-through inside a building where the sensor moves to a non-mapped room (A, illustrated in (right)) without losing track of its position and, then, it performs two loops outside the building (C and D).

To illustrate the benefits of the proposed odometer integration in the pose update component, the inventors recorded a track where, starting from the inside of building (a), they moved into a non scanned room and performed some loops by going out of the building and entering from a different door. FIG. 13 shows the results achieved.

Notice how, when the sensor leaves the known environment (cases A, C and D), the tracking relies on the odometer only. Also, during the transitions between the known map and the non-mapped areas, the point selection strategy proposed gradually takes more information from the most convenient map without any specific logic to deal with these situations (take for example the transition shown in case C, right). As it can be observed, the accuracy of the proposed registration algorithm ensures that, when the user reenters the map after exploring the non-mapped areas, the odometer drift is low enough so that the tracking using the reference map can continue. Finally, when the sensor is moving inside the known space, it can be noticed how some of the points used for registration are taken from the odometer. This is generally due to the presence of points that have no valid correspondences in the reference map, but they do in the local map of the odometer. For instance, the environment in case B has big windows that allow the sensor to acquire points from the outside, which are not present in the original map.

Overall Accuracy and Performance

To measure the overall accuracy of the proposed pose tracking technique, the inventors performed an analysis of the ICP residuals after each cloud registration. This is imposed by the lack of a ground truth trajectory for free motion over a large indoor scenario, since the area to cover is too big for using accurate external reference systems.

Figure 14:
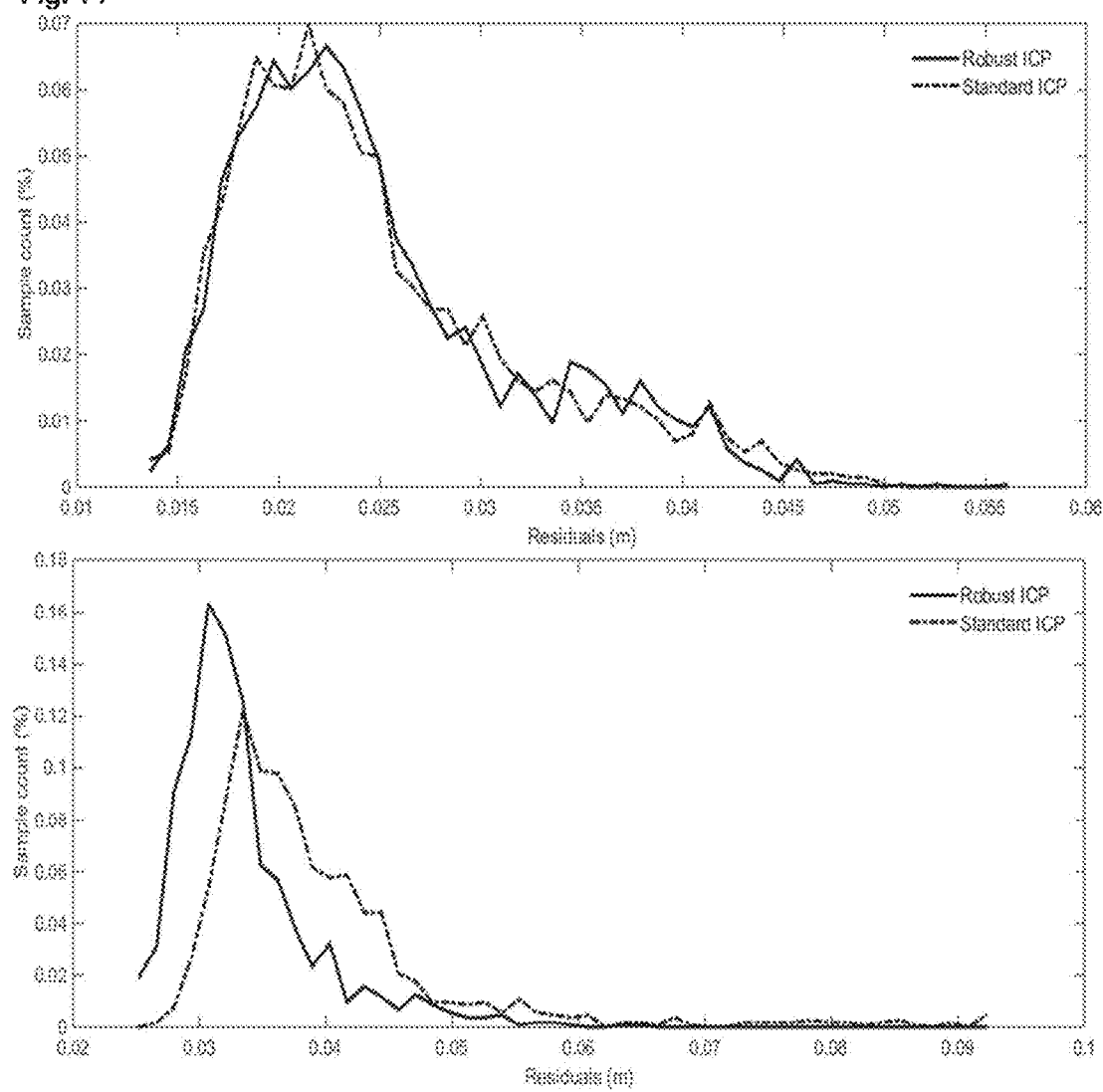
FIG. 14: Tracking accuracy comparison between the standard ICP (dashed line) and the proposed robust implementation (solid line) in an environment without outliers (upper) and in an environment with outliers (lower).

FIG. 14 (upper) shows the average point-plane distances when moving inside an outlier-free scenario for both, the classical point-plane ICP algorithm and for the present robust ICP. The absence of outliers was ensured by performing the acquisitions immediately after scanning the ground truth model, represented using a voxel cell size of 10. Residuals for both approaches are almost identical, peaking on 2, which is within the nominal accuracy of the Velodyne HDL-32E sensor.

On the other hand, FIG. 14 (lower) shows significant differences when changes are introduced into the environment. In this case, the track was recorded after refurbishing the environment. The present robust ICP implementation provides much better results than using the classical point-plane ICP, due to the efficient selection of inlier correspondences. In this case, residuals peak in 3 due to the interference of the outliers in the point-plane distance estimation for computing the shown histogram.

Figure 15:
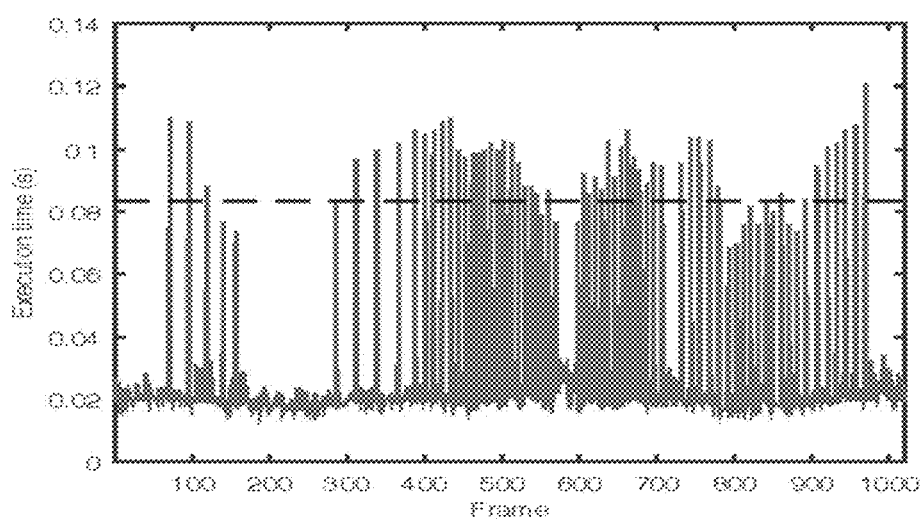
FIG. 15: System overall performance during tracking for a backpack mounted setup: solid gray lines are the time spent in processing each frame (in seconds). The dashed horizontal line indicates the maximum execution time for real-time results using a Velodyne HDL-32E sensor (12 Hz).

Given that the system must provide results in real-time, the inventors measured the overall performance during the pose tracking for different kinds of motion in all the datasets. FIG. 15 shows the execution time spent in registering each cloud and computing the new pose of the sensor for a walking setup scenario. This process takes normally between 20 and 30 ms but, at some frames, a peak around 100 ms is observed. These peaks are related to the kd-tree generation for the odometer, which is triggered when a fixed distance is travelled since the time of the last update of the tree. The faster the sensor moves, the more this event will affect the overall performance. To avoid frame dropping, the kd-tree generation and the odometer runs in different threads and the latter uses the last available kd-tree until the new one is ready.

In Table VII average performance of the system is shown for three different setups (walking, segway mounted and car mounted). Notice how, the faster the sensor moves, the lowest the performance due to the odometer kd-tree updates. Since the Velodyne HDL-32E sensor provides readings at 12 Hz, all cases ensure real-time results, leaving processor time for performing additional operations. Finally, notice that in the current implementation all tracking computations were performed using a single CPU core.

TABLE VII

System execution performance for different setups.

| setup | performance |
|---|---|
| backpack mounted | 39.98 |
| segway mounted | 27.36 |
| car mounted | 23.34 |

5 Conclusion

The present invention presents a complete system with preferred embodiments to assist in indoor localization applications that provides real-time results and scales well to the map size, allowing the exploration of very large environments.

By adding a pre-processing stage, an efficient place recognizer has been proposed that exploits the local motion of the sensor, measured using an odometer, and a compact and fast-to-compute descriptor. During the training of the place recognizer, a search space reduction strategy has been proposed that considers the physical constraints related to a particular operation mode of the system.

Pose tracking is performed using an efficient map representation, that provides constant nearest neighbour searching times, and that keeps memory requirements low. The present registration algorithm provides robust results by (1) selecting points that ensure geometric stability, (2) efficiently discarding outliers and (3) being fused with a local odometer which allows using points not present in the reference map for registration and navigating through non-mapped areas.

Experimental results have proven the system to be highly scalable, perform tracking at frame rate leaving plenty of CPU time to run additional operations and to produce very accurate results (within the nominal accuracy of the sensor used), even when plenty of outliers are introduced.

The invention claimed is:

1. A method executed by a processor for real-time mapping, localization and change analysis of an environment, in particular in a GPS-denied environment, comprising:
   (A) if no 3D reference map of the environment exists, constructing a 3D reference map of said environment by
      (a) acquiring the environment with a mobile real-time laser range scanner (1) at a rate of at least 5 frames per second to provide 3D scanner data,
      (b) constructing a map presentation using the 3D scanner data for each of a plurality of poses of the laser range scanner (1), each pose having an associated point cloud defined by the 3D scanner data, the map presentation having a data structure is set to natively handle 3D points and is based on a hybrid structure composed by a sparse voxelized structure used to index a compact dense list of features in the map presentation, allowing constant time random access in voxel coordinates independently from the map size and efficient storage of the data with scalability over the environment, and
      (c) building, using the map presentation, the 3D reference map for the environment using a 3D Simultaneous Localization And Mapping (3D SLAM) framework, said building comprising (i) using an odometer module, estimating a current pose of the laser range scanner (1) based on the registration of a last point cloud to a local map presentation, (ii) using a local trajectory optimization module, refining the trajectory of a set of point clouds in order to minimize the drift in the local map presentation, and (iii) performing offline a global trajectory optimization by reconstructing an entire map of the environment taking into account loop closures of trajectories, thereby forming said 3D reference map; and (B) based on an existing 3D reference map of the environment, performing real-time mapping, localization and change analysis of said environment by (d) acquiring the environment with a real-time laser range scanner (1) at a rate of at least 5 frames per second to provide 3D scanner data, (e) during place recognition, identifying a current location of the laser range scanner (1) inside the environment with no prior knowledge of the laser range scanner pose during place recognition, and pre-computing of simple and compact descriptors of a scene acquired by the laser range scanner (1) using a reduced search space within the scene in order to self-localize the scanner in real-time, each descriptor of the scene comprising a range image of regular bins where each bin has estimated median range value, (f) after determination of the localization of the scanner in the environment, tracking the scanner pose by registering current scanner data inside said existing 3D reference map of the environment using standard Iterative Closest Point method employing data comprising nearest-neighbor information stored in the 3D reference map, (g) calculating the distance between each scan point in the current scanner data and nearest point in the 3D reference map, wherein change analysis is performed by applying a threshold to this distance, whereby each point in the current scanner data which does not have a corresponding neighbor in the reference model is considered a change, (h) displaying information about the 3D reference map and the current 3D scanner data on a real-time user interface, said information being preferably color-coded according to a change/no-change classification of said information.

2. The method of claim 1, wherein the local trajectory optimization module comprises a local window mechanism optimizing a trajectory fragment composed by a set of poses and their associated point clouds with respect to a map built up to the last registered set, wherein points are preferably converted in world coordinates using pose interpolation in $\mathbb{SE}3$ group and wherein a generalization of Iterative Closest Point method is preferably used to find the trajectory that better aligns all the points to the map; wherein the local window mechanism operates such that, when the distance between the first and the last pose in the list is larger than a threshold, cloud poses are optimized and a new list is produced with the refined pose and the input clouds.

3. The method of claim 1, wherein the data structure maintains five different representations of the data stored, thereby granting consistency between internal data representations after each map update, the five representations being (i) a (compact and dense) list of features, L and an index to the last element, $L_{last}$, where each element, $l_i \in L$, contains all the information associated to a feature in the map, such as position and normal unit vector in world coordinates, and preferably additional information, (ii) a (compact and dense) validity mask, M, where each element, $m_i \in M$, is a boolean value indicating if its corresponding sample, $l_i \in L$, is valid or not, ensuring that $m_i=0, i > L_{last}$, (iii) a list of holes, H, where each element, $h_i \in H < L_{last}$, indicates that $l_{h_i}$ is not valid so, $m_{h_i}=0$, (iv) a sparse voxel representation V, built with a parametrizable cell size, that stores in each cell, $v_i \in V$, the index of its corresponding feature in L, wherein features in L and cells in V are related in a one-to-one manner, based on the position of $l_i$ and the cell size of V, and (v) a kd-tree, K, which is used to perform nearest neighbor searches on the map and which only stores references to the dense list L to keep its memory footprint low.

4. The method of claim 3, wherein, given an area of interest expressed by a central position and a radius, inner features are selected by looping over the elements stored in L and the kd-tree K is rebuilt as a fast mechanism for nearest neighbor searches.

5. The method of claim 1, wherein step (e) comprises the identification of a set of possible locations of the scanner based on the scanner data of step (d), said step (e) further the following substeps:

(b1) based on the last 3D scanner data, computing an associated descriptor q and recovering a set of candidate locations $\Gamma$ by performing a radial search on T given a threshold radius r in the descriptor space, preferably for 360° horizontal view scanner data, increasing the candidate locations by computing additional input descriptors by horizontally shifting range values, each descriptor corresponding to the readings that the scanner would produce if rotated on its local axis and then rotating according to i each resulting set of candidate locations, (b2) associating a weight $w_{\Gamma_p}$ to each potential location $\Gamma_p \in \Gamma$:

$$w_{\Gamma_p} = 1 - \frac{\|d_p - q\|}{r},$$

where $d_p$ is the descriptor associated to the location $\Gamma_p$ retrieved from T, $w_{\Gamma_p}$ is 1 for perfectly matching descriptors and 0 for descriptors on the search sphere boundary, and (b3) collecting weights in w and normalizing these weights to have max w=1.

6. The method of claim 1, wherein step (e) comprises the identification of a set of possible locations of the scanner based on the scanner data of step (d), said step (e) further the following substeps:

(b1) based on the last 3D scanner data, computing an associated descriptor q and recovering a set of candidate locations $\Gamma$, the candidate locations having a descriptor similar to q, (b2) associating a weight $w_{\Gamma_p}$ to each potential location $\Gamma_p \in \Gamma$:

$$w_{\Gamma_p} = 1 - \frac{\|d_p - q\|}{r},$$

where $d_p$ is the descriptor associated to the location $\Gamma_p$ retrieved from T, $w_{\Gamma_p}$ is 1 for perfectly matching descriptors and 0 for descriptors on the search sphere boundary, (b3) collecting weights in w and normalizing these weights to have max w=1, (b4) updating the set of candidate locations while the sensor moves by estimating the movement and re-evaluating the weight for each initial candidate pose based on the query results at the new pose, and (b5) iterating the update substep until the candidate poses converge to a single location.

7. The method of claim 6, for ground motion, whereby the laser range scanner (1) is mounted on a person or on a vehicle traversing a floor, comprising the following steps (i) identifying in the 3D reference map the extents of the floor, wherein floor extraction is performed over a sparse voxel representation of the environment, V, where each full cell, $v^{(i)}$, of the sparse voxel representation contains a normal vector to the surface locally defined by the points around its centroid, $\bar{n}^{(i)}$, by extracting a subset of voxels that represent candidate floor cells, $F \subseteq V$, by checking that the vertical component in their associated normals is dominant, i.e. $\bar{n}^{(i)} \cdot (0,0,1)^T \geq \varepsilon$, where $\varepsilon$ is typically a value between 0.5 and 1

(ii) determining reachability of cells, wherein given a reachable cell $f \in F$, all surrounding cells $(g^{(1)}, g^{(2)}, \ldots, g^{(m)}) \in F$ are considered as reachable if the following conditions are satisfied:

$$\|f - g^{(i)}\| \leq \theta_0 \qquad (6)$$

$$\|f_z - g_z^{(i)}\| \leq \theta_1 \qquad (7)$$

$$C_{g^{(i)}} \cap V = \emptyset \qquad (8)$$

where $\theta_0 \geq V_{cellSize}$ in (6) stands for the maximum step distance (e.g. 0.5 meters for a walking motion, or $V_{cellSize}$ for a car motion), $\theta_1$ in (7) stands for the maximum vertical step size and $C_{g^{(i)}}$ in (8) stands for the simplified volume of the observer, centered over the floor cell $g_i$.

8. The method of claim 7, wherein the map structure comprises two different lists of elements that are stored and synchronized: a compact list of planes, L, and a dense grid of voxels, V, built with a specific voxel size, each plane $l_i \in L$ storing a position in world coordinates, $p_i$, and a unit normal, $\bar{n}_i$; wherein each voxel, $v_i \in V$ stores a current state that can be either full, empty or near, full voxels storing an index to the plane $l_{v_i} \in L$, whose associated position falls into, empty cells storing a null reference and near cells storing an index to the plane $l_{v_i} \in L$ whose associated position distance $d_v$ to the voxel centre is the smallest; preferably a near voxel is considered only if the distance $d_v$ is under a given threshold $d_{max}$, otherwise the voxel is considered empty.

9. The method of claim 8, wherein, to improve overall system robustness, the scanner tracking is combined with an odometer, wherein after a pose has been estimated, its associated points in world coordinates are stored into a kd-tree, given a new acquisition by the laser range scanner (1), when a registration algorithm creates the sets of points $(P_i^W)$, it looks for nearest neighbors in both the reference map $(q_i^M, \bar{n}_i^M)$ and in the previously fixed point cloud $(q_i^O, \bar{n}_i^O)$, wherein correspondences are defined as:

$$c_i^{(j)} = \begin{cases} \{p_i^W, q_i^M, \bar{n}_i^M\} & \|p_i^W - q_i^M\| - s \leq \|p_i^O - q_i^O\| \\ \{p_i^W, q_i^O, \bar{n}_i^O\} & \|p_i^W - q_i^M\| - s > \|p_i^O - q_i^O\| \end{cases},$$

where S corresponds to the voxel cell size and compensates the different resolution between the voxelized ground truth map and the non-discretized kd-tree of the previously fixed cloud.

10. A mobile laser scanning device for real-time mapping, localization and change analysis, in particular in GPS-denied environments, arranged for implementing the method of claim 1.

11. The method of claim 10 further comprising using the mobile laser scanning device of claim 10 for 3D indoor mapping/modelling; facility management; accurate and real-time indoor localization and navigation; assistance to disabled or elderly people; design information verification; change analysis, such as for safeguards inspections; progress monitoring, such as for civil construction; or disaster management and response.

12. The mobile laser scanning device of claim 10, comprising a real-time laser range scanner (1), a processing unit (3), a power supply unit and a hand-held visualization and control unit (4), wherein the real-time laser range scanner (1) is capable of acquiring the environment with a rate of at least 5 frames per second to provide scanner data, the processing unit (3) is arranged to analyze said scanner data and to provide processing results comprising 3D map/model, localization and change information to the hand-held visualization and control unit (4), which is arranged to display said processing results and to allow a user to control the mobile laser scanning device.

13. The mobile laser scanning device of claim 12, wherein the visualization and control unit (4) is a tablet computer.

14. The mobile laser scanning device of claim 13, wherein said mobile laser scanning device is a backpack (2) or vehicle mounted device.

\* \* \* \* \*